US006741930B2

United States Patent
Fukushima et al.

(10) Patent No.: US 6,741,930 B2
(45) Date of Patent: May 25, 2004

(54) COMMUNICATION NAVIGATION SYSTEM AND METHOD, PROGRAM STORAGE DEVICE AND COMPUTER DATA SIGNAL EMBODIED IN CARRIER WAVE

(75) Inventors: Atsuhiko Fukushima, Saitama (JP); Toyohiro Takenaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 97 days.

(21) Appl. No.: 10/231,462

(22) Filed: Aug. 30, 2002

(65) Prior Publication Data

US 2003/0060975 A1 Mar. 27, 2003

(30) Foreign Application Priority Data

Sep. 3, 2001 (JP) ........................................ 2001-266476

(51) Int. Cl.⁷ .......................... G01C 21/30; G01C 21/36
(52) U.S. Cl. ...................... 701/209; 701/207; 701/216; 340/995.12; 340/995.19; 342/357.14
(58) Field of Search ................................. 701/209, 200, 701/201, 206, 207, 208, 210, 216; 340/995.12, 995.19; 342/357.14

(56) References Cited

U.S. PATENT DOCUMENTS

| 6,353,412 | B1 | * | 3/2002 | Soliman ...................... 342/387 |
| 6,487,497 | B2 | * | 11/2002 | Khavakh et al. ............. 701/209 |
| 6,526,348 | B1 | * | 2/2003 | McDonough ................ 701/209 |
| 6,678,611 | B2 | * | 1/2004 | Khavakh et al. ............. 701/210 |

FOREIGN PATENT DOCUMENTS

| JP | 7-262493 | 10/1995 |
| JP | 10-96644 | 4/1998 |

* cited by examiner

*Primary Examiner*—Thomas G. Black
*Assistant Examiner*—Arthur D. Donnelly
(74) *Attorney, Agent, or Firm*—Sughrue Mion, PLLC

(57) ABSTRACT

A communication navigation system is provided with: a communication navigation terminal (5) and a communication center apparatus (3) with a communication network (2) for connecting them. The communication navigation terminal is provided with a traveling locus recording device (36, 24) for preferentially holding a traveling locus recorded when a movable body is driving out of a service area of the communication navigation system; and a processing device (20) for performing a route search and the like on the basis of this preferentially held traveling locus.

30 Claims, 13 Drawing Sheets

COMMUNICATION NAVIGATION SYSTEM AND METHOD, PROGRAM STORAGE DEVICE AND COMPUTER DATA SIGNAL EMBODIED IN CARRIER WAVE

BACKGROUND OF THE INVENTION

1. Field of the Invention

The present invention relates to a communication navigation system and a communication navigation method for vehicle use or the like, which can perform navigation processing, such as route search, route navigation, map display, and the like, at least partially by using a communication network, as well as a program storage device and a computer data signal embodiment in a carrier wave.

2. Description of the Related Art

Nowadays, research and development on electronic control for controlling the drive of a vehicle are advanced, and navigation systems for aiding in driving are significantly spread and popularized. This navigation system generally has various databases and such a basic structure that displays, on a display device, map information, current position information, various guidance information, and the like. Moreover, it searches for a drive route on the basis of an inputted condition.

A function called as a "route search" or "path search" of a navigation apparatus mounted on a vehicle is designed to be capable of searching for an optimum route connecting an origin and a destination, both of which are designated by a user. It is also designed to lead and guide (navigate) the user to the destination by displaying on a map a current position based on a self-contained or built-in positioning measurement or a GPS (Global Positioning System) measurement and the searched optimum route.

With respect to a traditional navigation apparatus, this kind of route search is performed by microprocessor processing in the apparatus on the basis of the map database information stored in a map information record medium (e.g. a DVD-ROM) equipped in the navigation apparatus. More concretely, the route search is executed by using "information for a route search", which enables a search for the optimum route based on predetermined mathematical algorithm, such as link information corresponding to a road part between branching points and intersections, node information including coordinates information (e.g., absolute position information on latitude and longitude, or on altitude, latitude and longitude) corresponding to the branching points and the intersections of roads or the like among the map database information. Generally, in view of its nature of being for route search, this kind of information for a route search is constructed by the link information, the node information, and the like, which are about broad areas where roads are mutually connected, for example, such as throughout Honshu or the main island of Japan, throughout Japan, or the like, so that its volume of data becomes enormous, which increases the whole amount of data of the map database information.

Moreover, the map database information includes data of added information, which may be facility guidance information on tourist attractions/facilities, facility numerals, names (characters) of maps/roads, views of waters/railroads, and roads, in each one of many pieces of map information (drawings). These data as well as the above-described information for the route search further increase the volume of data of the map database information.

By the way, the search for the optimum route requires the newest map database information because of changes, new constructions, and the like on roads.

Therefore, there is a need to equip for the traditional navigation apparatus a map information record medium that stores the map database information which is the newest and whose data volume is enormous. At the same time, there is a need of the display processing and the search processing of the optimum route based on the complicated map database information. In this case, there is a need to mount a microprocessor unit (MPU), which is capable of high-speed processing, so that the scale of the processing and that of the apparatus come to increase.

On that account, various communication navigation systems are suggested in order to improve such increase of the scale of the processing and that of the apparatus. In these communication navigation systems, the map database information is obtained and provided through two-way wireless communication between a communication center apparatus on a communication network and a communication navigation terminal mounted on a vehicle (e.g. refer to the examples of Japanese Patent Application Laying Open NO. Hei 7-262493 "a system for distributing map information for a movable body" and Japanese Patent Application Laying Open NO. Hei 10-96644 "a system for guiding a moving route").

The communication center apparatus in the communication navigation system in this kind can quickly and cheaply provide the newest map database information, because, for example, all we need is update the map database information of one communication center apparatus to the newest information, comparing to the case of providing an information record medium, which stores the newest map database information, for an individual navigation apparatus mounted on a movable body. Therefore, users side becomes able to receive the map database information including the newest information for the route search or the like.

Moreover, there has been developed such a communication navigation system that is designed not to perform the route search on the side of the communication navigation terminal, but to transmit information indicating a current position or an origin and a destination on the side of the communication navigation terminal, to perform the route search according to these by a high performance processor on the side of the communication center apparatus, to receive this search result and display it in a predetermined format on the side of the communication navigation terminal and so on.

However, the above-described communication navigation system has the following disadvantage.

It is impossible to have a service of navigation in the area that an electric wave cannot arrive in with a sufficient electric field intensity to use a wireless device. Usually, in this situation, there is no problem while driving along a route of a preset drive plan, however, in the case of deviating from the route by some reasons, if the area is out of a service area, it becomes impossible to obtain information to return the original route. For example, if it is impossible to transmit and receive the necessary information for the route search, then it is impossible to perform a route search to return to the route from which the movable body has deviated (hereinafter, such a route search is referred to as a "reroute search" as the occasion demands) on the side of the communication navigation terminal. Alternatively, if it is impossible to receive information on a current position or the like, then it is impossible to perform the reroute search on the side of the communication center apparatus. Moreover, if it is impossible to transmit and receive the search result, there is no meaning to perform the reroute search. Particularly, a movable body communication network is placed along expressways and main highways in many cases, and once the movable body deviates from this road, it is impossible to communicate, which is sufficiently assumed. Moreover, in the current situation, the infrastructure of a communication device such as a cellular phone or the like is not sufficiently promoted in mountain areas, and even in the future, it is difficult to think of the possibility to promote the infrastructure to cover all districts including depopulated areas, in the view of economic investment efficiency.

On that account, it is extremely important to construct a device for executing some navigation processing, such as searching for a route or a direction to be traveled, providing the search result, and the like, even if a vehicle enters into the area that it cannot communicate from its communication terminal, when expanding the use of the communication navigation system.

SUMMARY OF THE INVENTION

It is therefore an object of the present invention to provide a communication navigation system and a communication navigation method, which enable a search for a route to be traveled or the like, even if a movable body such as a vehicle or the like goes out of a service area of the communication navigation system, as well as a program storage device and a computer data signal embodiment in a carrier wave.

The above object of the present invention can be achieved by a first communication navigation system provided with: a communication center apparatus; and a communication navigation terminal, both of which transmit and receive information by a two-way communication through a communication network, (i) the communication center apparatus provided with: a map database for storing therein map database information including information for a route search, which enables the route search from a current position of a movable body to a destination by a predetermined algorithm; a search device for searching, by the predetermined algorithm, for a route heading to the destination from the current position, on the basis of the map database information including the information for the route search, according to the destination and the current position received through the communication network; and a center side wireless device for wirelessly transmitting route information indicating the searched route through the communication network, (ii) said communication navigation terminal provided with: a measurement device for measuring the current position; a terminal side wireless device for transmitting the measured current position and receiving the transmitted route information through the communication network; a traveling locus recording device for recording a traveling locus of the movable body such that it preferentially holds the traveling locus recorded when the movable body is moving out of a service area of the communication navigation system; and a processing device for performing navigation processing of a predetermined type based on the preferentially held traveling locus in case that the movable body is moving out of the service area.

According to the first communication navigation system of the present invention, the communication center apparatus is provided with the map database. This map database stores large-scale map database information including the information for the route search such as the above-described node information, link information, or the like, which enables a search for an optimum route from an origin to a destination by predetermined mathematical algorithm such as Dijkstra's algorithm and so on. When the communication navigation is performed, route search request information indicating an origin and a destination may be firstly transmitted by a user communication terminal such as a cellular phone, a mobile, a facsimile, a personal computer, or the like at a user's home, a communication navigation terminal, which is carried by a user or which is mounted on a user's movable body, and so on. Secondly, the communication center apparatus receives this information through the communication network. Then, at the communication center apparatus, the search device searches for the optimum route with respect to the received route search request information with the predetermined algorithm such as Dijkstra's algorithm or the like on the basis of the information for the route search included in the above-described map database information. Then, the center side wireless device wirelessly transmits, through the communication network, the searched information, including information on a plurality of guidance positions, for example, such as a branching point, an intersection, or the like, located on this searched route. In this specification, the "guidance position" is referred to a position at which it is preferable to perform the route navigation or the route guidance of some kind in order to drive on a predetermined route. Moreover, the "information on guidance positions" is information that allows the specification of locations of the guidance positions somehow, such as coordinates information that indicates absolute locations of the guidance positions, coordinates information that indicates relative locations with the absolute location as a standard, and the like.

On the side of the communication navigation terminal, the terminal side wireless device receives the route information indicating the optimum route from the current position to the destination, which has been transmitted from the center side wireless device of the communication center apparatus. This route information is recorded in the communication navigation terminal, and it is read out and displayed when the processing device performs the navigation processing such as route display, map display including the route, route navigation, route guidance, and the like. Map information for display used in this case can be obtained such that when the optimum route is presented from the communication center apparatus, the related map information within a predetermined range is transmitted at the same time. In this case, the map information for display can decrease in the volume of data to be transmitted and received, by cutting the related information within a predetermined range from the map database information including the information for the route search, whose data volume is huge, and transmitting it, and thus a recording device of the communication navigation terminal may be small. Alternatively, if the simple map information having small data volume is available, the map information may be stored in a storing device such as a DVD or the like equipped for the communication navigation terminal, and a related part may be read out from this.

Moreover, the communication navigation terminal is provided with a measurement device for measuring the current position. This is constructed by, for example, a GPS measurement device or a self-contained or built-in positioning apparatus for detecting a velocity, an acceleration velocity, an angular velocity, and the like, which is mounted on the movable body.

Here, the traveling locus recording device, which is constructed by, for example, a RAM, a hard disk, a DVD-RAM, and the like and which is equipped for the communication navigation terminal, records the traveling locus of the movable body. This recording may be or may be not performed within the service area of the communication navigation system, but at least, it is performed out of the communication navigation system. Then, especially with respect to the traveling locus recorded when the movable body is moving out of the service area, it is preferentially held. Then, in case that the movable body is moving out of the service area, the processing device performs the navigation processing of the predetermined type based on the preferentially held traveling locus, held by this traveling locus recording device. Namely, out of the service area, it is difficult or impossible to execute the route search on the communication center apparatus through the communication network. Besides, in view of the nature of the communication navigation, there are basically fewer information sources to search for a route and a direction to be traveled on the side of the communication navigation terminal. That is why the traveling locus, which is held by the traveling locus recording device in the past, is extremely helpful this time as the information source to search for the route and the direction to be traveled, out of the service area where the communication network cannot be used.

Incidentally, although the traveling locus is more or less recorded in traditional on-vehicle navigation systems, this is recorded without questioning whether it is within or out of the service area and the old ones are sequentially deleted while storing the new ones. Moreover, it is impossible for those traditional systems to hold the traveling locus out of the service area where the communication network cannot be used as the useful information source.

On the contrast, according to the present invention, since the traveling locus out of the service area is preferentially held by the traveling locus recording device, even in case that the movable body drives out of the service area later, it becomes possible to perform the navigation processing of the predetermined type, such as the search for the route and the direction to be traveled and the like, on the basis of this preferentially held traveling locus. For example, even out of the service area, it is possible to execute the processing relatively easily on the basis of the traveling locus in the past, such as the route search to a specified destination which has been visited in the past, the route search for a return route, and the like.

As described above, the first communication navigation system of the present invention, in which the communication navigation terminal mounted on the movable body is simply constructed with essential functions, is intended to execute the navigation processing, such as the route search and the like, by using the traveling locus in the past, even if the movable body goes out of the service area of the communication navigation system, in which the searching and operating functions in high quality requiring time are installed at the communication center apparatus.

In one aspect of the first communication navigation system of the present invention, the traveling locus recording device records the traveling locus with information indicating within or out of the service area.

According to this aspect, it becomes possible to treat with the traveling loci within and out of the service area of the communication navigation system while dividing or identifying them easily. Namely, the traveling locus out of the service area is helpful for the route search or the like when the movable body is out of the service area. On the other hand, if the movable body is within the service area, apparently, the communication center apparatus is accessed to perform the route search or the like, so the availability of the traveling locus is low.

In another aspect of the first communication navigation system of the present invention, the traveling locus recording device deletes the traveling locus recorded when the movable body is traveling within the service area, in an order from old to new one.

According to this aspect, in case that the route search or the is like is executed at the communication navigation terminal, it becomes possible to hold the locus data of the outer service area more, by the amount of deleting the traveling locus within the service area, which gives major effect to the route search out of the service area or the like. Moreover, even about the traveling locus within the service area, it is possible to hold, to some degree, the one which is relatively highly useful since it is new.

In another aspect of the first communication navigation system of the present invention, the traveling locus recording device gives priority to recording the traveling locus out of the service area than to recording the traveling locus within the service area until the traveling locus out of the service area occupies a predetermined ratio of a record area of said traveling locus recording device, and the traveling locus recording device replaces the traveling locus in an order from old to new one.

According to this aspect, it becomes possible to record the traveling locus within the service area at a predetermined ratio at the traveling locus recording device. Moreover, it prevents all of the recorded traveling loci from becoming the ones out of the service area.

In another aspect of the first communication navigation system of the present invention, the traveling locus recording device is equipped with a first record area for recording the traveling locus within the service area and a second record area for recording the traveling locus out of the service area and replaces the traveling locus in an order from old to new one respectively in the first and second record areas.

According to this aspect, the traveling locus within the service area can be recorded and held in the range of the first record area capacity, and the traveling locus out of the service area can be recorded and held in the range of the second record area capacity. Thus, it is prevented that all of the recorded traveling loci become the ones out of the service area, and at the same time, and the search of the data of the outer service is quickly performed. As for the first and second record area capacities, the whole record capacity may be distributed at a predetermined rate, considering their importance. Moreover, as for rewriting, the new traveling loci are replaced in the order to old to new one in each area.

In another aspect of the first communication navigation system of the present invention, the navigation processing of a predetermined type is processing of searching for at least one of a route and a direction to be traveled by the movable body, from the measured current position and the preferentially held traveling locus.

According to this aspect, out of the service area, it is possible to search for the route and the direction to be traveled by the movable body, on the basis of the traveling locus in the past, which is preferentially held by the traveling locus recording device.

The above object of the present invention can be achieved by a second communication navigation system provided with: a communication center apparatus; and a communication navigation terminal, both of which transmit and receive information by a two-way communication through a communication network, (i) the communication center apparatus provided with: a map database for storing therein map database information including information for a route search, which enables the route search from a current position of a movable body to a destination by a predetermined algorithm; a search device for searching, by the predetermined algorithm, for a route heading to the destination from the current position, on the basis of the map database information including the information for the route search, from the destination and the current position received through the communication network; and a center side wireless device for wirelessly transmitting route information indicating the searched route through the communication network, (ii) the communication navigation terminal provided with: a measurement device for measuring the current position; a terminal side wireless device for transmitting the measured current position and receiving the transmitted route information through the communication network; a traveling locus recording device for recording a traveling locus of the movable body; and a processing device for searching for at least one of a route and a direction to be traveled by the movable body as navigation processing of a predetermined type based on the measured current position and the recorded traveling locus in case that the movable body is moving out of the service area.

According to the second communication navigation system, which is different from the case of the above described first communication navigation system of the present invention, the traveling locus recording device records the traveling locus of the movable body without questioning whether it is within or out of the service area. Then, out of the service area, the processing device searches for at least one of the route and the direction to be traveled by the movable body, on the basis of this recorded traveling locus and the current position measured by the measurement device. Namely, comparing to the above described first communication navigation system of the present invention, in case that the movable body travels one area, which is out of the service area, the possibility of the traveling locus, which was obtained when having traveled within the same area in the past, being recorded in the traveling locus recording area becomes low. However, if there is the traveling locus, it becomes still possible to surely search for at least one of the route and the direction to be traveled on the basis of this recorded traveling locus and the current position.

Incidentally, although the traveling locus is more or less recorded in traditional on-vehicle navigation systems, it is impossible for those traditional systems to use the traveling locus out of the service area where the communication network cannot be used, as the useful information source to search for the route and the direction to be traveled, out of the service area.

As described above, the second communication navigation system of the present invention, in which the communication navigation terminal mounted on the movable body is simply constructed with essential functions, is intended to execute the navigation processing, such as the route search and the like, by using the traveling locus in the past, even if the movable body goes out of the service area of the communication navigation system, in which the searching and operating functions in high quality requiring time are installed at the communication center apparatus.

In another aspect of the first or second communication navigation system of the present invention, the communication navigation terminal is further provided with a judgment device for judging whether the current position is within or out of the service area.

According to this aspect, in case that the movable body goes out of the service area of the communication navigation system, in response to that, it becomes possible to appropriately deal with the route navigation, the simple navigation, the route search, and the like by automatic or manual operations.

In one aspect provided with the above described judgment device, it may be constructed such that the judgment device judges on the basis of an electric field intensity of an electric wave received by the terminal side wireless device.

By constituting in this manner, if the electric field intensity level of the electric wave received by the terminal side wireless device of the communication navigation terminal is low and information cannot be transmitted in sufficient quality, it is judged out of the service area of the communication navigation. If judged out of the service area, it is possible to automatically perform the navigation processing based on the traveling locus recorded in the traveling locus recording device, or it is possible to inform the fact of a driver by displaying it on the display device of the communication navigation terminal, alarming with a speaker, or the like.

In another aspect provided with the above described judgment device, it may be constructed such that the judgment device judges by transmitting a predetermined data row to the communication center apparatus from said communication navigation terminal, restoring the received data row at the communication center apparatus and transmitting it back to the communication navigation terminal, and then comparing the received data row with the transmitted data row at the communication navigation terminal.

By constituting in this manner, the communication navigation terminal judges whether the current position is within or out of the service area by emitting a signal for checking to the communication center apparatus, receiving and analyzing a signal for replying which has been transmitted, and judging whether or not the communication quality is sufficient. For example, it transmits predetermined data and has the communication center apparatus transmitted the data back. After receiving the data, it compares the transmitted data with the received data to obtain the frequency of errors and judges whether the current position is within or out of the service area. In this manner, it is possible to judge whether or not it is possible to have a service in the total communication system including the condition of the communication center apparatus in addition to the condition of the wireless communication network, which becomes a communication medium.

In another aspect provided with the above described judgment device, it may be constructed such that a judgment of the judgment device is performed at a predetermined time interval.

By constituting in this manner, the terminal side wireless device of the communication navigation terminal receives a carrier wave of a wireless line at predetermined time intervals and monitors its electric field intensity while the movable body is driving. If the electric field intensity level is equal to or lower than a predetermined level, it is judged out of the service area.

In another aspect provided with the above described judgment device, it may be constructed such that a judgment of the judgment device is performed at a predetermined driving distance interval.

By constituting in this manner, the terminal side wireless device of the communication navigation terminal receives a carrier wave of a wireless line and monitors its electric field intensity every time the movable body drives a predetermined distance while the movable body is moving. If the electric field intensity level is equal to or lower than a predetermined level, it is judged out of the service area. According to this method, it becomes possible to omit the operation of judgment regardless of the case of rarely driving because of traffic congestion. Moreover, it becomes possible to sufficiently understand the first driving distance after the movable body goes out of the service area.

In another aspect provided with the above described judgment device, it may be constructed such that the processing device performs the navigation processing of the predetermined type in case that the current position is judged to belong out of the service area by the judgment device.

By constituting in this manner, in case that the current position is judged to belong out of the service area by the judgment device, the processing device automatically performs the search for the route and the direction to be traveled and the like, on the basis of the traveling locus in the past, which is recorded in the traveling locus recording device Therefore, in the eyes of users, it is possible to obtain a screen display and/or an audio output of the route guidance or the like as a result of the navigation processing, without being aware of whether or not the current position is out of the service area.

In another aspect of the first or second communication navigation system of the present invention, the system is further provided with a user communication terminal for performing a two-way communication on the communication network, the user communication terminal being capable of transmitting the destination to said communication center apparatus.

According to this aspect, the user communication terminal, such as a personal computer, a facsimile, a mobile, a cellar phone, and the like, which are installed at the user's home, transmits the route search request information, and the center side wireless device receives this route search request information. Since the route that meets the condition presented by the user is searched for on the basis of this information at the communication center apparatus, it becomes possible to request the route search before the user actually starts moving. The searched route information may be transmitted or transported to the communication navigation terminal through the wireless communication device directly from the communication center apparatus. It may also be transported to the communication navigation terminal after stored in the user communication terminal once. The transportation to the communication navigation terminal from the user communication terminal may be performed with a wireless device or through a memory medium such as a magnetic record medium, a semiconductor memory, or the like.

The above object of the present invention can be achieved by a communication navigation terminal included in the above described first or second communication navigation system (including its various aspects).

According to the communication navigation terminal of the present invention, it is possible to establish the above described first or second communication navigation system of the present invention by the use of this with the communication center apparatus and the communication network related to the present invention as described above. Moreover, even if a lot of communication navigation terminals are connected to the same communication center apparatus, each of them can obtain the benefit from the communication navigation system.

The above object of the present invention can be achieved by a first program storage device readable by a computer for tangibly embodying a program of instructions executable by the computer, which causes the computer to function as the communication navigation terminal in the above-described first or second communication navigation system (including its various aspects), more concretely, at various constitutional elements, such as the measurement device, the terminal side wireless device, the traveling locus recording device, the processing device and the like, which constitute the communication navigation terminal.

According to the first program storage device, the above described communication navigation terminal of the present invention can be relatively easily realized as a computer reads and executes the program of instructions from the program storage device such as a CD-ROM (Compact Disc-Read Only Memory), a DVD-ROM (DVD Read Only Memory), a hard disc or the like, or as it executes the program of instructions after downloading the program through communication device.

The above object of the present invention can be also achieved by a first computer data signal embodied in a carrier wave and representing a series of instructions which causes a computer to function as the communication navigation terminal in the above-described first or second communication navigation system (including its various aspects), more concretely, at various constitutional elements, such as the measurement device, the terminal side wireless device, the traveling locus recording device, the processing device and the like, which constitute the communication navigation terminal.

According to the first computer data signal embodied in the carrier wave of the present invention, as the computer downloads the program in the computer data signal through a computer network or the like, and executes this program, it is possible to realize the above described communication navigation terminal of the present invention.

The above object of the present invention can be achieved by a second program storage device readable by a computer for tangibly embodying a program of instructions executable by the computer, which causes the computer to function as the above described first or second communication navigation system (including its various aspects), more concretely, on one hand, at various constitutional elements, such as the map database, the search device, the center side wireless device and the like, which constitute the communication center apparatus, and on the other hand, at various constitutional elements, such as the measurement device, the terminal side wireless device, the traveling locus recording device, the processing device and the like, which constitute the communication navigation terminal.

According to the second program storage device, the above described first or second communication navigation system of the present invention can be relatively easily realized as a computer reads and executes the program of instructions from the program storage device such as a CD-ROM, a DVD-ROM, a hard disc or the like, or as it executes the program of instructions after downloading the program through communication device. For example, the communication navigation terminal may be constructed such that it has a browser function and that the computer program to use is substantially or partially provided from the side of the communication center apparatus, as occasion demands.

The above object of the present invention can be achieved by a second computer data signal embodied in a carrier wave and representing a series of instructions which causes a computer to function as the above described first or second communication navigation system (including its various aspects), more concretely, on one hand, at various constitutional elements, such as the map database, the search device, the center side wireless device and the like, which constitute the communication center apparatus, and on the other hand, at various constitutional elements, such as the measurement device, the terminal side wireless device, the traveling locus recording device, the processing device and the like, which constitute the communication navigation terminal.

According to the second computer data signal embodied in the carrier wave of the present invention, as the computer downloads the program in the computer data signal through a computer network or the like, and executes this program, it is possible to realize the above described first or second communication navigation system associated with the present invention. For example, the communication navigation terminal may be constructed such that it has a browser function and that the computer program to use is substantially or partially provided from the side of the communication center apparatus, as occasion demands.

Incidentally, the above object of the present invention can be achieved by another program storage device readable by a computer for tangibly embodying a program of instructions executable by the computer, which causes the computer to function as the communication center apparatus included in the above described first or second communication navigation system of the present invention (including its various aspects), more concretely, at various constitutional elements, such as the map database, the search device, the center side wireless device and the like, which constitute the communication center apparatus.

The above object of the present invention can be achieved by another computer data signal embodied in a carrier wave and representing a series of instructions which causes a computer to function as the communication center apparatus included in the above described first or second communication navigation system of the present invention (including its various aspects), more concretely, at various constitutional elements, such as the map database, the search device, the center side wireless device and the like, which constitute the communication center apparatus.

The above object of the present invention can be achieved by a first communication navigation method executed in a communication navigation system provided with: a communication center apparatus; and a communication navigation terminal, both of which transmit and receive information by a two-way communication through a communication network, the method provided with: (i) at the communication center apparatus, a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and a center side wireless process of wirelessly transmitting route information indicating the searched route through the communication network, and (ii) at the communication navigation terminal, a measurement process of measuring the current position; a terminal side wireless process of transmitting the measured current position and receiving the transmitted route information through the communication network; a traveling locus recording process of recording a traveling locus of the movable body such that it preferentially holds the traveling locus recorded when the movable body is moving out of a service area of the communication navigation system; and a process of performing navigation processing of a predetermined type based on the preferentially held traveling locus in case that the movable body is moving out of the service area.

According to the first communication navigation method of the present invention, as is the case with the above described first communication navigation system of the present invention, since the traveling locus out of the service area is preferentially held by the traveling locus recording device, even in case that the movable body drives out of the service area later, it becomes still possible to perform the navigation processing of the predetermined type, such as the search for the route and the direction to be traveled and the like, on the basis of this preferentially held traveling locus.

The above object of the present invention can be achieved by a second communication navigation method executed in a communication navigation system provided with; a communication center apparatus; and a communication navigation terminal, both of which transmit and receive information by a two-way communication through a communication network, the method provided with: (i) at the communication center apparatus, a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and a center side wireless process of wirelessly transmitting route information indicating the searched route through the communication network, and (ii) at the communication navigation terminal, a measurement process of measuring the current position; a terminal side wireless process of transmitting the measured current position and receiving the transmitted route information through the communication network; a traveling locus recording process of recording a traveling locus of the movable body; and a process of searching for at least one of a route and a direction to be traveled by the movable body as navigation processing of a predetermined type based on the measured current position and the recorded traveling locus in case that the movable body is moving out of the service area.

According to the second communication navigation method of the present invention, as is the case with the above described second communication navigation system of the present invention, in case that the movable body travels one area out of the service area, if there is recorded the traveling locus, which was obtained when having traveled within the same area in the past, it becomes still possible to surely search for at least one of the route and the direction to be traveled on the basis of this traveling locus and the current position.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments associated with a communication navigation system and a communication navigation method, a program storage device, and a computer data signal embodiment in a carrier wave of the present invention will be now explained. Incidentally, each embodiment, which will be described below, is intended to establish the communication navigation system of the present invention as a system to search for a moving route to be traveled by a vehicle out of the service area of the communication navigation system, by an on-vehicle communication navigation terminal.

(I) First Embodiment

Figure 1:
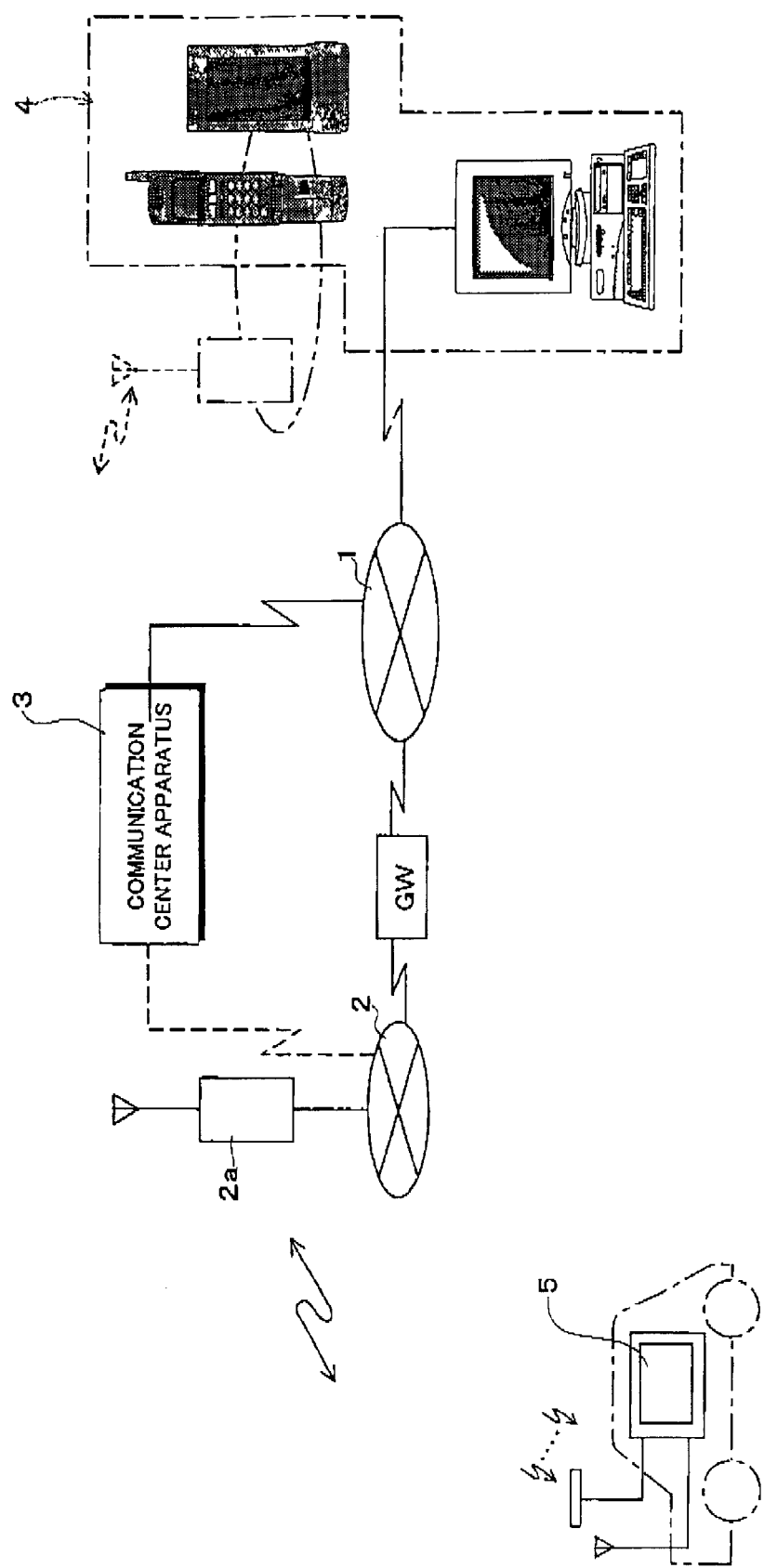
FIG. 1 is a block diagram showing the whole structure of a communication navigation system in a first embodiment of the present invention.

Firstly, the whole structure of the communication navigation system in the first embodiment will be explained with reference to FIG. 1. FIG. 1 is a block diagram showing the whole structure of the communication navigation system in the first embodiment.

In FIG. 1, a digital point-to-point communication line network 1 and a digital mobile communication network 2 (hereunder, the two communication networks are collectively referred to as a "communication line network" as the occasion demands), both of which are connected to each other by a gateway (GW) device for communication protocol conversion, are provided in the first embodiment. On this communication line network, IP (Internet Protocol) packet communication is performed under the TCP/IP (Transmission Control Protocol/Internet Protocol) environment (e.g. the Internet).

The digital point-to-point communication line network 1 is connected to a communication center apparatus 3 for a communication navigation company, a personal computer or the like installed at a user's home as one example of a communication terminal 4 for users.

At a cell base station 2a of the digital mobile communication network 2, a cellular phone, a mobile or hand-carry type information terminal/PDA (Personal Digital Assistants), and the like as other examples of the communication terminal 4 are accommodated and further an on-vehicle communication navigation terminal 5 mounted on the user's vehicle is accommodated through a wireless section (air interface).

The communication center apparatus 3 is constructed to perform maintenance and preservation, which have been traditionally performed at an on-vehicle navigation apparatus, of the newest map database information including the map information for display of various scales, the information for the route search, and the like, which have enormous data volume. Moreover, it is designed to perform the search processing of the optimum route, whose load of processing is heavy, in place of the on-vehicle navigation apparatus.

The communication terminal 4 is constructed to request the communication center apparatus 3 to provide the map information, to search for the optimum route, and so on. Moreover, it is constructed to give instructions of where to transmit the requested map information or the like. Incidentally, the request and the instruction of where to transmit described above can be performed from the communication navigation terminal 5 in the same manner as those from the communication terminal 4.

The communication navigation terminal 5 is for vehicle use, downloads the map information for display that is minimally required for display from among the map database information of the communication center apparatus 3 at least when displaying a map during a navigation operation, and is equipped with a record medium, such as a CD, a DVD for storing the map information for display or the like. Then, along with screen-displaying the road map by using the map information for display in this kind, it displays the optimum route to a destination, a location of a vehicle, a moving direction, scale circle/radius, a driving locus, a map direction or orientation, and the like The communication center apparatus 3, the communication terminal 4, and the communication navigation terminal 5 are equipped with a communication application program (e.g. Web browser), which will be explained in detail later.

Incidentally, the communication network in FIG. 1 is not especially limited to the TCP/IP method, and various data communication methods are available. It also allows the use of an analog point-to-point communication line network instead of the digital point-to-point communication line network 1.

Figure 2:
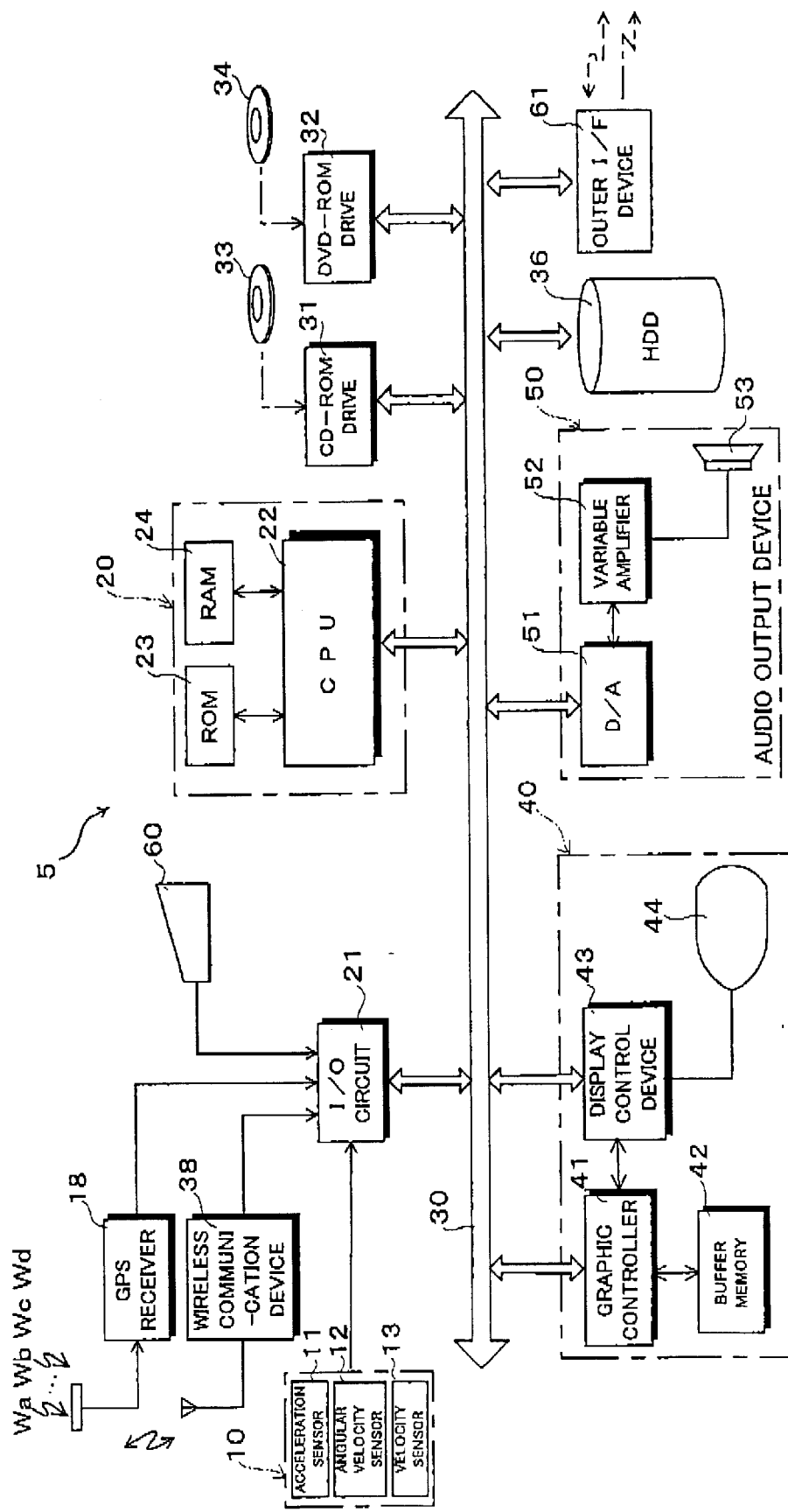
FIG. 2 is a block diagram showing an example of the inner structure of a communication navigation terminal shown in FIG. 1 in the first embodiment.

Next, the communication navigation terminal 5 shown in FIG. 1 will be further explained with reference to FIG. 2. FIG. 2 is a block diagram showing an example of the inner structure of the communication navigation terminal 5 shown in FIG. 1.

In FIG. 2, this communication navigation terminal 5 is provided with a self-contained positioning apparatus 10, a GPS receiver 18, a system controller 20, an input and output (I/O) circuit 21, a CD-ROM drive 31, a DVD-ROM drive 32, a hard disk device (HDD) 36, a wireless communication device 38, a display device 40, an audio output device 50, an input device 60, and an outer interface (I/F) device 61. Each component is connected to a bus line 30 for transmitting processing data and control data.

In the first embodiment, the wireless communication device 38 constitutes one example of the terminal side wireless device, and the system controller 20 constitutes one example of the processing device.

The self-contained positioning apparatus 10 is constructed by an acceleration sensor 11, an angular velocity sensor 12, and a velocity sensor 13. The acceleration sensor 11, which is constructed by a piezoelectric element, for example, outputs acceleration data obtained by detection of the acceleration of a vehicle. The angular velocity sensor 12, which is constructed by a vibration gyro, for example, outputs angular velocity data and relative azimuth data obtained by detection of the angular velocity of a vehicle when the vehicle changes its moving direction. The velocity sensor 13 detects the rotation of a vehicle shaft mechanically, magnetically, or optically and outputs signals of the number of pulses corresponding to a vehicle speed at every rotation for a predetermined angle around a vehicle shaft.

The GPS receiver 18 has a known structure, provided with a memory, a microprocessor unit (MPU), a digital signal processor unit (DSP) or the like, as well as a high frequency reception processing device and a plane polarization non-directional receiving antenna. The GPS receiver 18 is constructed to receive electric waves Wa to Wc (when desired to obtain more reliable values, four electric waves Wa to Wd) from at least three GPS satellites placed into the orbit around the earth, to perform the inverse-diffusion of spectra, the distance measurement, the Doppler measurement, and the orbital data processing, and to continuously output absolute position information of a reception position (a driving position of a vehicle) from the I/O circuit 21 to the bus line 30 after the calculation of a moving velocity/azimuth and the calculation of a location. The system controller 20 takes in the calculation result and screen-displays it on the map road.

The system controller 20 is constructed by a CPU (Central Processing Unit) 22, a ROM (Read Only Memory) 23, which is a non-volatile solid storage element, and a RAM (Random Access Memory) 24, for working and exchanges data with each component connected to the bus line 30. The processing control by this exchange of data is executed by a control program and a boot program stored in the ROM 23. The RAM 24 temporarily stores setting information, which changes map display (e.g., changes it to a full-scale or local map display) by the user's operation from the input device 60, especially.

The CD-ROM drive 31 and the DVD-ROM drive 32 read out from a CD-ROM 33 and a DVD-ROM 34 respectively and output the map database information (e.g., various road data, such as a road width, the number of traffic lanes, or the like, on map information (drawings)), which is stored in both the CD-ROM 33 and the DVD-ROM 34.

Incidentally, it is possible to install either one of the CD-ROM drive 31 and the DVD-ROM drive 32, and it is also possible to install one compatible drive.

The hard disk device 36 can store map (image) data, which are read in at the CD-ROM drive 31 or the DVD-ROM drive 32, and after this storing, it can read out them at an arbitrary time. The hard disk device 36 can further store video data and audio data, both of which are read in from the CD-ROM drive 31 and the DVD-ROM 32. Because of this, for example, it becomes possible to read out the video data and the audio data stored in the hard disk device 36 and output them as video and as sound or voice, while reading out the map data on the CD-ROM 33 and the DVD-ROM 34 to perform the navigation operation. Alternatively, it becomes possible to read out the map data stored in the hard disk device 36 to perform the navigation operation, while reading out the video data and the audio data on the CD-ROM 33 and the DVD-ROM 34 and outputting them as video and as sound. Moreover, it becomes possible, by storing into the hard disk device 36 the map data, the video data, or the audio data, which are downloaded by the wireless communication device 38, to read and output them at an arbitrary time.

The wireless communication device 38 has the same structure as that of a general-purpose cellular phone, which is known as TDMA, TDD, or CDMA structure (a high-frequency wireless transmitting/receiving device, an encoding/decoding device, a time division multiplexing device, a control device, an audio input/output device, and the like) in the manner of PDC (Personal Digital Cellular Telecommunication System) or PHS (Personal Handyphone System), for example.

The display device 40 screen-displays various processing data under the control of the system controller 20. A graphic controller 41 inside the display device 40 controls each component of the display device 40 on the basis of the control data transmitted from the CPU 22 through the bus line 30. Moreover, a buffer memory 42 using the V-RAM or the like temporarily memorizes immediately-displayable image information. Furthermore, along with a display control device 43 controlling display, a display 44, which is constructed by a liquid crystal display (LCD), an EL (Electro-Luminescence), or a CRT (cathode-ray tube), screen-displays the image data outputted from the graphic controller 41. This display 44 is installed in the vicinity of a front panel in a vehicle, for example.

At the audio output device 50, a D/A converter 51 performs a digital to analog conversion on an audio signal transmitted through the bus line 30 under the control of the system controller 20. A variable amplifier (AMP) 52 variably amplifies the audio analog signal outputted from the D/A converter 51, and outputs it to a speaker 53, from which it is audio-outputted, The input device 60 is provided with a key, a switch, a button, a remote controller, an audio input device, and so on, to input various types of commands and data. The input device 60 is installed in the vicinity of the display 44 or a front panel of a main body of the on-vehicle navigation system mounted on the vehicle.

Incidentally, the communication navigation terminal 5 is not limited to the above-described structure. For example, the GPS receiver 18 is built in the communication navigation terminal 5 and is wired and connected to the I/O circuit 21 in the above-described structure. However, it is also possible to employ such a structure that a general-purpose mobile or hand-carry type GPS receiver is wired and connected (interface connected) to the outer I/F device 61. It is also possible to employ such a wireless connection manner that a weak radio transmitting/receiving device (e.g. Bluetooth frequency hopping communication manner) is installed to the general-purpose mobile or hand-carry type GPS receiver at the outer I/F device 61.

In the same manner as the GPS receiver 18 does, the wireless communication device 38 can also employ such a structure that a general-purpose mobile or hand-carry type cellular phone is wired and connected (interface connected) to the outer I/F device 61. It is also possible to employ a wireless connection manner that a weak radio transmitting/receiving device is installed to the general-purpose mobile or hand-carry type cellular phone at the outer I/F device 61.

Moreover, the input device 60 can also employ an infrared ray remote control manner and/or the same weak radio transmission/reception manner as those of the wireless communication device 38 and the GPS receiver 18. The infrared ray remote control manner is designed such that it uses a remote controller to perform infrared ray remote manipulation by user's hands, with an infrared ray reception device and a decoder built in the communication navigation terminal 5 (in general, they are installed in the vicinity of the display 44).

Figure 3:
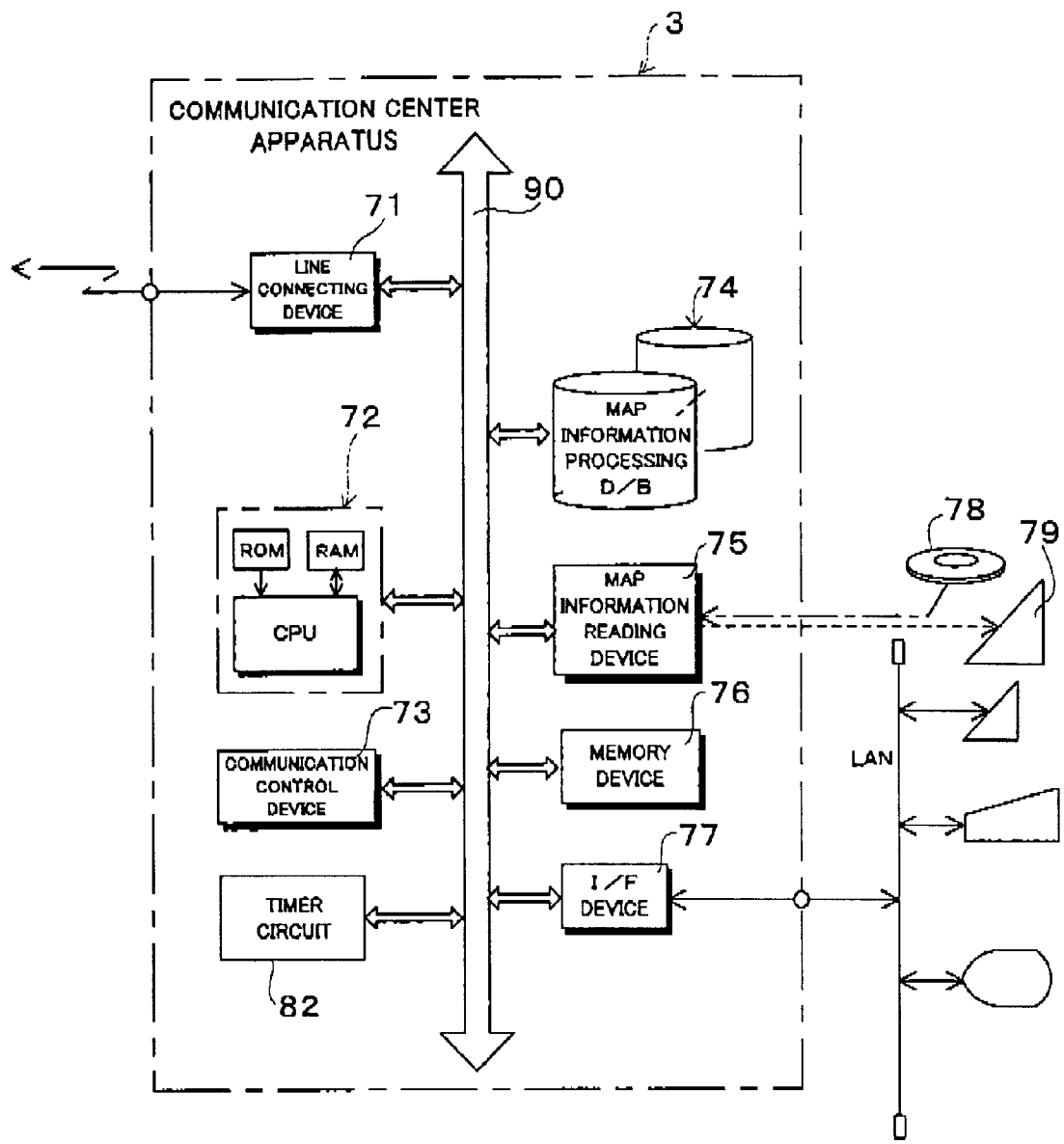
FIG. 3 is a block diagram showing an example of the inner structure of a communication center apparatus shown in FIG. 1 in the first embodiment.

Next, the communication center apparatus 3 shown in FIG. 1 will be further explained with reference to FIG. 3. FIG. 3 is a block diagram showing an example of the inner structure of the communication center apparatus 3.

In FIG. 3, this communication center apparatus 3 is provided with a line connecting device 71, a microprocessor 72, a communication control device 73, a map information processing database (D/B) device 74, a map information reading device 75, a memory device 76, an interface (I/F) device 77, a DVD-ROM 78 (a CD-ROM is also available), a communication terminal 79, a timer circuit 82, and a bus line 90.

Especially in this embodiment, the communication control device 73 constitutes one example of a center side wireless device, and the map information processing database device 74 constitutes one example of a search device.

The line connecting device 71 is intended to accommodate the communication center apparatus 3 in the digital point-to-point communication line network 1, and it is provided with a DSU (Digital Service Unit), which is a terminating device, a router, a firewall, and the like, for example. Incidentally, the line connecting device 71 is equipped with a network control unit (NCU), a modulator-demodulator (modem), and the like in the case of using an analog point-to-point communication line network instead of the digital point-to-point communication line network 1 in FIG. 1.

The microprocessor 72 is provided with a ROM, a working RAM, and a CPU. The communication center apparatus 3 controls each component on the basis of a program, and its control data and processing data are exchanged through the bus line 90. The microprocessor 72 further works with the map information processing database device 74 to execute various data processing such as the search processing of the optimum route or the like, which will be explained later.

The communication control device 73 works with the line connecting device 71 to execute the communication protocol with the communication line network. For example, it executes the TCP/IP.

The map information processing database device 74 stores the map database information including the map information for display of various scales, the information for the route search constructed by the link information, the node information, and the like, which have enormous data volumes and which cover road networks spread in a broad area such as throughout Honshu or the main island of Japan or throughout Japan and so on. Moreover, the map information processing database device 74 uses this map database information to execute data processing, such as the search processing of the optimum route or the like, with the microprocessor 72.

The map information reading device 75 operates as a drive, which reads out the map database information from the CD-ROM or DVD-ROM 78. The map database information from the CD-ROM or DVD-ROM 78 is transmitted to and stored into the map information processing database device 74 through the bus line 90. The map database information at the map information processing database device 74 is updated by reading out data from the CD-ROM or DVD-ROM 78, which stores the newest map database information.

The memory device 76 holds information on setting an apparatus and a variable in control processing of the microprocessor 72 transmitted through the bus line 90.

The I/F device 77 accommodates an outer LAN (Local Area Network) to execute the information processing and maintenance of various types such as replacement of the map database information at the map information reading device 75.

The communication terminal 79 is intended to take in the map database information instead of the CD-ROM or DVD-ROM 78. For example, it is intended to on-line-download (receive) the map database information provided from a map information preparing organization to install it into the map information processing database device 74. Therefore, the map database information at the map information processing database device 74 may be updated through the communication terminal 79.

Incidentally, in the case that this communication center apparatus 3 is used as the Internet, it will be a portal site structure. For example, it is provided with a Web server, a FTP (File Transfer Protocol) file transmitting server, a DNS (Domain Name System) server, a FAX/e-mail server, and so on.

A cellular phone as the communication terminal 4 shown in FIG. 1 also has a structure known as the PDC manner and the PHS manner (TDMA, TDD, or CDMA). A PDA or a compact general-purpose computer as the communication terminal 4 also has a familiar structure operation, and each detailed explanation will be omitted. The cellular phone as the communication terminal 4 is equipped with an application (an exclusive browser) for browsing contents of exclusive HTML (Hypertext markup language) tag description, which is accessible to the Internet. Moreover, the PDA or the compact general-purpose computer is also equipped with an application (browser/mailer application program) accessible to the Internet, which is a known structure.

Especially in the first embodiment having the structure described with reference to FIG. 1 to FIG. 3, the communication center apparatus 3 performs the route search, which has been traditionally performed inside the on-vehicle navigation apparatus, by the microprocessor 72 and the map information procession D/B device 74 Then, it provides the communication navigation terminal 5 with the route information including the optimum route obtained as the result of the route search.

The communication terminal 4 is constructed to give instructions of where to transmit the information for the route search as well as requesting the route search of the communication center apparatus 3. Incidentally, these kinds of route search requests and instructions of where to transmit can be performed from the communication navigation terminal 5 in the same manner as those from the communication terminal 4.

The communication navigation terminal 5 uses the route information wirelessly transmitted from the communication center apparatus 3 to perform route display on a map road. Moreover, at the communication navigation terminal 5, it is also possible to perform route guidance of right turn, left turn, straight advance, or the like at each guidance position according to the route guidance information on the each guidance position on the route transmitted with the route information. With respect to the route guidance information in this kind, it is not necessary to wirelessly transmit it with the route information. It is also possible to otherwise produce the route guidance information in this kind on the basis of the route information received on the side of the communication navigation terminal 5.

Especially in this embodiment, the map information processing database device 74 of the communication center apparatus 3 stores the map database information whose data volume is enormous and which includes a wider variety of information than the map data stored in the CD-ROM 33, the DVD-ROM 34, the HDD 36, or the like of the communication navigation terminal 5. Namely, the map database information including the map information for display of various scales, the information for the route search constructed by the link information, the node information, and the like, which cover road networks spread in a broad area such as throughout Honshu or the main island of Japan or throughout Japan and so on. Moreover, this map database information includes data of added information, for example, such as map scales, guidance information of tourist attractions/facilities, facility numerals and the name (characters) of maps/roads, views of waters/railroads, and roads, on each map. Among them, especially the information for the route search enables the route search based on the predetermined mathematical algorithm such as Dijkstra's algorithm or the like, and its data volume becomes enormous.

Furthermore, the search processing, which has the heavy load of processing based on the information for the route search having this enormous data volume, is not performed on the side of the communication navigation terminal 5 but is executed on the side of the communication center apparatus 3 by the map information processing database device 74 and the microprocessor 72.

As described above, the CD-ROM 33, the DVD-ROM 34, the HDD 36, and the like of the communication navigation terminal 5 do not store the information for the route search whose data volume is enormous, and their memory capacities are far smaller than that necessary for the map information processing database device 74, which is advantageous in view of simplifying the communication navigation terminal 5. Moreover, the route search based on the information for the route search is not executed on the side of the communication navigation terminal 5, which causes the light load of processing in the system controller 20, so that it is again advantageous in view of simplifying the communication navigation terminal 5. Furthermore, the route information is wirelessly transmitted as a result of the route search, and the information for the route search or the like, which has an enormous data volume, is not wirelessly transmitted, so that it is extremely advantageous in view of reducing the volume of data to be transmitted and received and in view of relatively low capacities of transmission and reception at the communication center apparatus 3 and the communication navigation terminal 5.

The data processing in the first embodiment, as designed above, and in the second embodiment, as will be described later, is executed mainly by the CPU 22 of the communication navigation terminal 5 shown in FIG. 2 and the microprocessor 72 and the map information processing database device 74 of the communication center apparatus 3 shown in FIG. 3. More concretely, in addition to a computer program for controlling basic operations in the navigation system such as display of a current position, display of a map, and the like, a computer program associated with display control of the optimum route based on the route information received from the communication center apparatus 3, transmission control of the route search request for the communication center apparatus 3, or the like is executed by the CPU 22 of the communication navigation terminal 5 shown in FIG. 2. On the other hand, a computer program associated with search control of the optimum route, reception control of the route search request, or the like is executed by the microprocessor 72 and the map information processing database device 74 of the communication center apparatus 3 shown in FIG. 3. The computer program executed at the CPU 22 may be stored in a built-in memory device such as a RAM 24 or the like in the system controller 20 shown in FIG. 2, or it may be downloaded through the wireless communication device 38 or the like. On the other hand, the computer program executed at the microprocessor 72 and the map information processing database device 74 may be stored in the memory device 76, the DVD-ROM 78, or the like shown in FIG. 3, or it may be downloaded through the line connecting device 71, the communication terminal 79, or the like.

Figure 4:
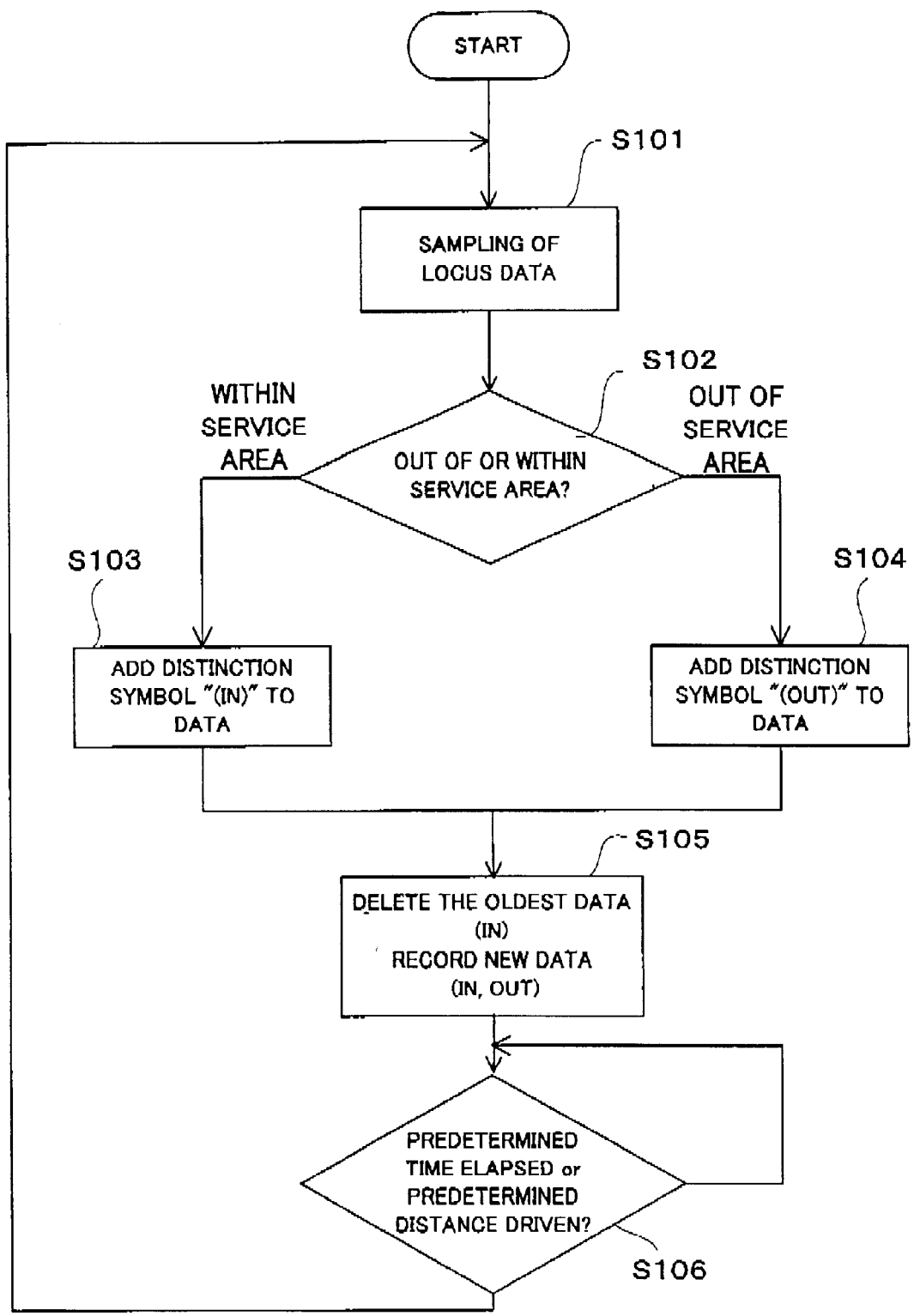
FIG. 4 is a flow chart showing operational flows of incorporating locus data in the first embodiment.
Figures 5A, 5B:
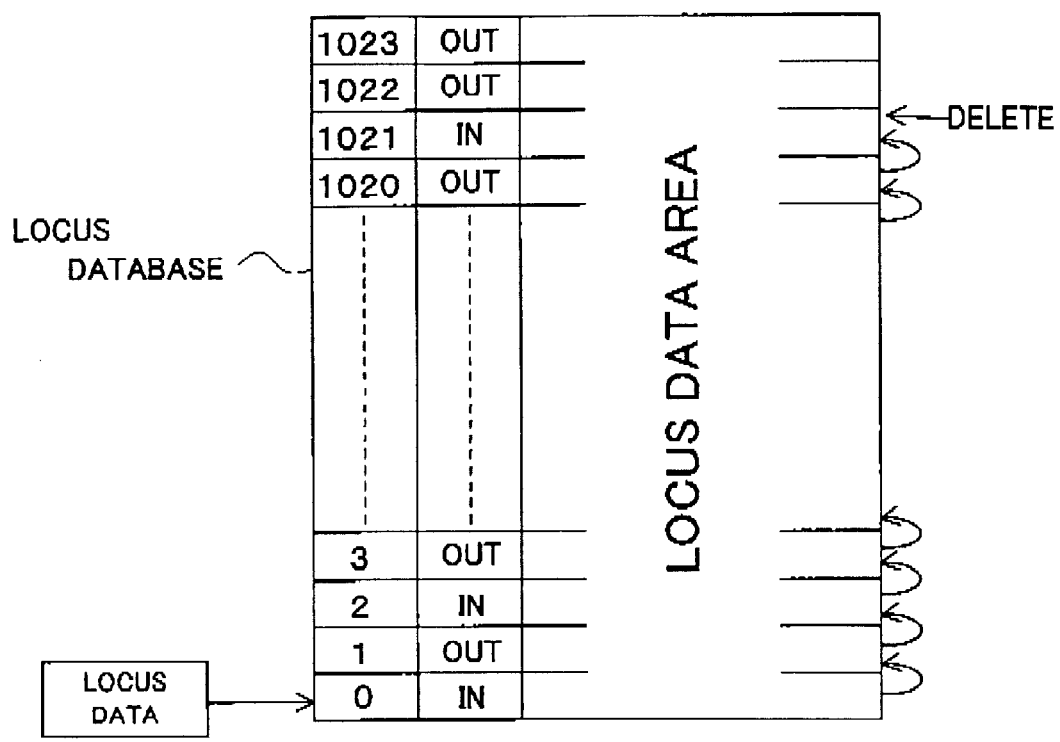
FIG. 5A and FIG. 5B are schematic diagrams showing a record condition of the locus data in the first embodiment.
Figure 6:
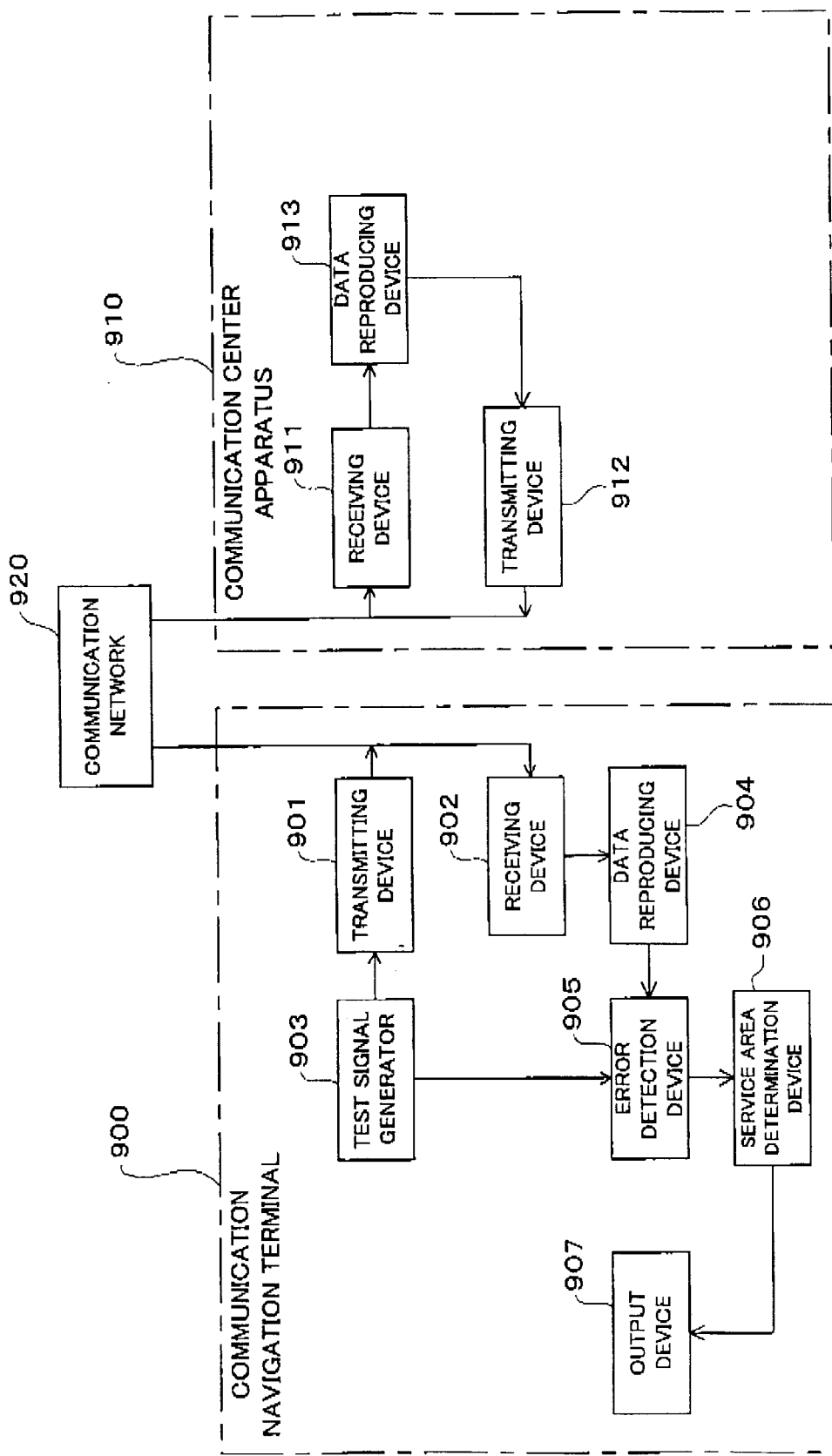
FIG. 6 is a block diagram showing one example of a structure of checking the quality of the communication in the first embodiment.
Figure 7:
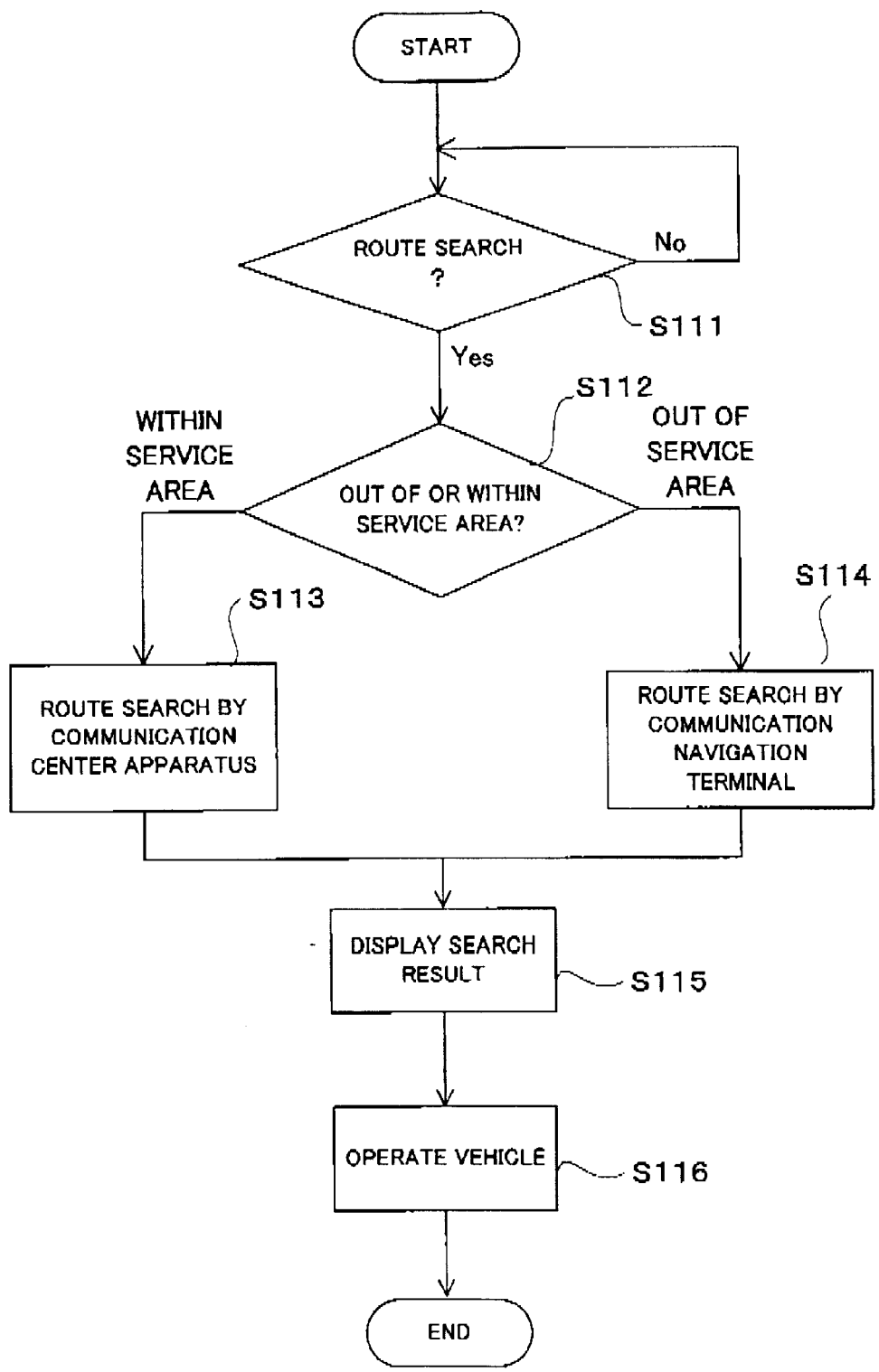
FIG. 7 is a flow chart showing a search for a drive route in the first embodiment.
Figure 8:
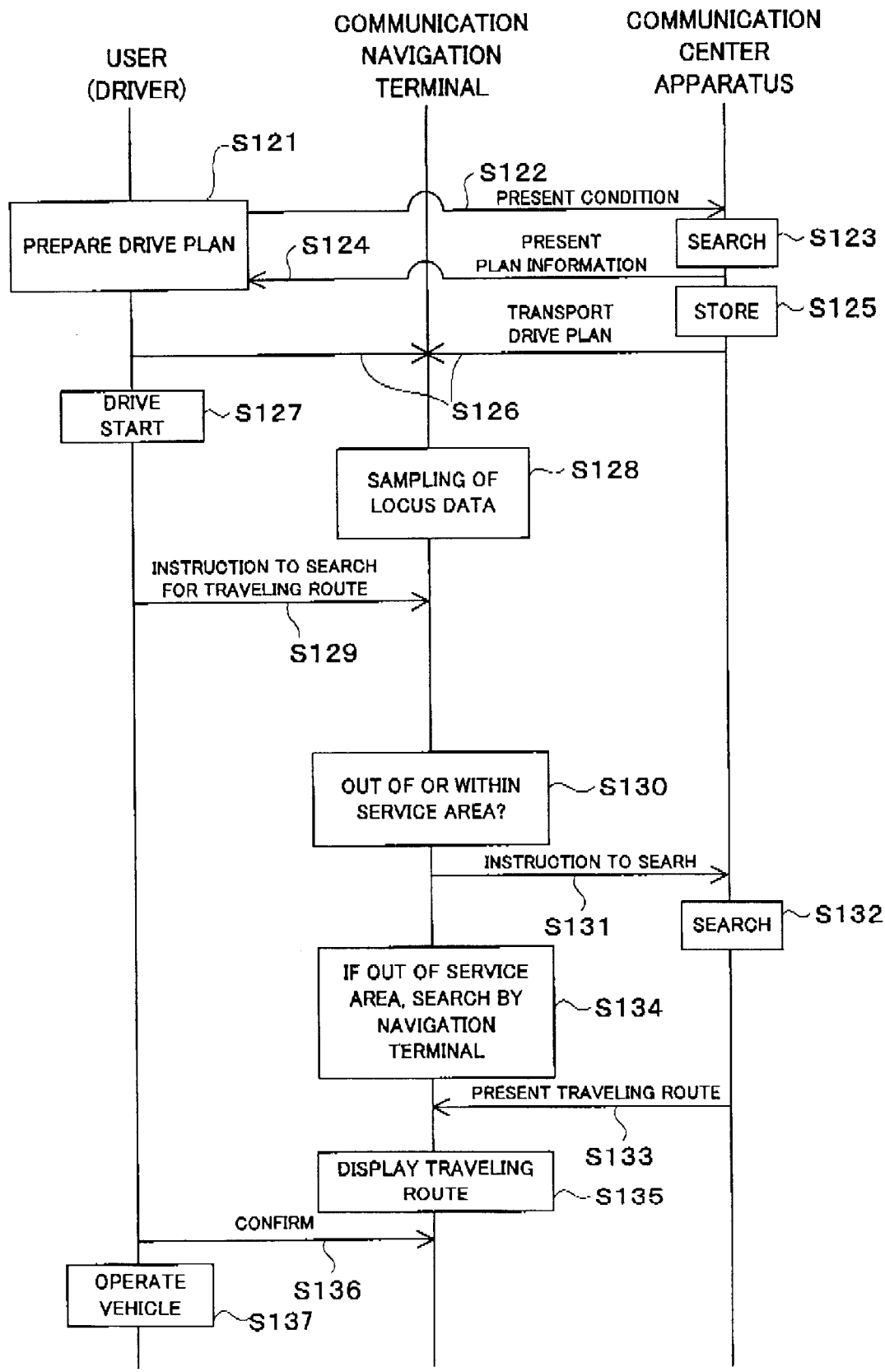
FIG. 8 is a sequence chart showing the search for the drive route in the first embodiment.

The structure of the communication navigation system of the present invention has been explained above, and now, the operation of this embodiment will be explained with reference to FIG. 4 to FIG. 8. FIG. 4 is a flow chart showing an operational flow of incorporating locus data (i.e., taking in or reading in locus data) in the first embodiment. FIG. 5A and FIG. 5B are schematic diagrams showing a record condition of the locus data in the first embodiment. FIG. 6 is a block diagram showing one example of a method of checking the quality of the communication. FIG. 7 is a flow chart showing a search for a drive route using the locus data of a vehicle in the first embodiment, and FIG. 8 is a sequence of the same.

The first embodiment is about the object of the present invention, i.e. the system for searching for a traveling route of a movable body such as a vehicle or the like under the environment in which radio messages cannot be reached or in which data cannot be transmitted in sufficient quality, when using the communication navigation system. Especially, it is preferably used for the route search of the vehicle going out of and returning to the service area of the communication navigation system. The explanation below will be performed with the vehicle as the movable body, but it is available to other movable bodies such as a ship and the like. Moreover, it is not limited to the route search of the vehicle returning to the service area, but it is available to various cases in which the aid in traveling of the vehicle is necessary under the environment where the service of the communication navigation system cannot be received.

As shown in FIG. 4, firstly, with respect to the incorporation (i.e., the taking in operation or the reading in operation) and the record of the locus data, the sampling of the locus data is performed at a predetermined interval upon the drive start (step S101). This is performed by receiving the electric waves Wa to Wd transmitted from the satellites with the GPS receiver 18 of the communication navigation terminal 5 shown in FIG. 2, obtaining by these the position of the self-car, i.e. the latitude, the longitude or the like, and recording it into a recording device such as the hard disk device 36 through the I/F circuit 21 and the bus 30 under the control of the microprocessor 20. The current position may the relative position information with respect to a predetermined position e.g. an origin (which is a start position for the pertinent drive) as a standard, in addition to the absolute value of latitude and longitude.

Secondly, it is judged whether the current position of the vehicle is within or out of the service area of the communication of the navigation system (step S102). This judgment can be performed on the basis of the level of the electric field intensity of the electric wave received by the communication navigation terminal 5. Namely, it is judged on the basis of the electric field intensity of the electric wave from the cell base station 2a, which spreads the signal from the communication center apparatus 3 that the communication navigation terminal 5 receives. If the electric field intensity is low and the transmitted information does not have sufficient quality because of noise, it is judged out of the service area. This is one device for judging, and other devices will be explained later.

In order to identify whether the current position is within or out of the service area, if it is within the service area according to the judgment in the step S102, a symbol meaning "within the service area" (e.g., "IN") is added to the locus data (step S103), and if it is out of the service area, a symbol meaning "out of the service area" (e.g., "OUT") is added to the locus data (step S104). After that, the locus data with the symbol added are transmitted to and recorded into the recording device.

If the record area of the recording device has some space, the locus data are sequentially recorded thereinto, but if the whole is already used, the locus data are deleted in the order of old data, so that the new ones are recorded. In this case, the locus data out of the service area is preferentially treated, and the locus data within the service area is regarded as the locus data to be deleted (step S105).

Next, it is judged whether a predetermined time period has elapsed or whether the self-vehicle has driven for a predetermined distance (step S106), and if such a condition is satisfied (step S106: Yes), the operational flow returns to the step S101 and the sampling of the next locus data is performed. In the case of employing such a structure that the sampling is performed for the predetermined time period, this can be used as data to estimate the driving condition, i.e. the data to estimate the traffic congestion condition of the road at this season at this time point. On the other hand, in the case of employing such a structure that the sampling is performed for the predetermined traveling distance interval, it is possible to prevent an operation of recording the locus data regardless of hardly driving because of the road congestion and to thereby effectively use the record area of the recording device.

Next, a recording method of the locus data will be explained with reference to FIG. 5A and FIG. 5B. FIG. 5A is a schematic diagram showing a record condition of the locus data before the new locus data are inputted. FIG. 5B is a schematic diagram showing a record condition of the locus data after the new locus data are inputted. They both are assumed to be in such a condition that the record area is fully occupied. If the record area has a vacancy, the data to be inputted may be recorded sequentially.

Assuming that it is possible to record in the record area, for example, 1024 locus data from the section 0 to the section 1023. Now, assuming that the locus data within the service area are newly inputted when the locus data have been already recorded, as shown in FIG. 5A, sequentially from the section 0 in such an order as IN (which is a symbol meaning "within the service area"), OUT (which is a symbol meaning "out of the service area"), IN, OUT, ..., OUT, IN, OUT, OUT (the section 1023). If giving the priority to the locus data of the outer service area (which is the area out of the service area) to treat with and to thereby remain them in the record area, the oldest locus data of the inner service area (which is the area within the service area), namely, the section 1021 in this case, is deleted. The next locus data is sequentially moved forward, which causes the record of the locus data of the inner service area at the section 0 (FIG. 5B). This operation can be performed at the microprocessors 20 on the basis of the symbols added to the locus data and the recorded sections. Incidentally, as the locus data, some data effective if served for various searches are recorded, such as date (year, month, day), a time point, environment information revealed by recorded map data and the current position of the vehicle, comment information of the driver inputted from the outer I/F device 61 and the like, in addition to the latitude and longitude.

Next, one concrete example of the judging method of whether the current position is within or out of the service area of the communication navigation system will be explained.

FIG. 6 is a schematic diagram showing its block structure.

In FIG. 6, the communication navigation system in the embodiment is established by connecting a communication navigation terminal 900 to a communication center apparatus 910 through a communication network 920. The communication network 920 includes the digital point-to-point communication line network 1, the digital mobile communication network 2, and the cell station 2a, which are shown in FIG. 1.

The communication navigation terminal 900 is provided with a transmitting device 901, a receiving device 902, a test signal generator 903, a data reproducing device 904, an error detection device 905, a service area determination device 906, and an output device 907. On the other hand, the communication center apparatus 910 is provided with a receiving device 911, a transmitting device 912, and a data reproducing device 913. The test signal generator 903 and the error detection device 905 are elements to be newly added to the communication navigation terminal with respect to the first embodiment as a standard, and as for other constitutional elements, those in the first embodiment are available.

The embodiment is intended to determine whether or not the current position is within the service area of the communication navigation system by (i) detecting communication data quality between the communication center apparatus 910 and the communication navigation terminal 900 and (ii) determining whether or not it is possible to transmit and receive data that are sufficiently trustworthy. The procedures will be sequentially explained.

Firstly, a signal having a predetermined data row is transmitted from the test signal generator 903 of the communication navigation terminal 900 through the transmitting device 901 and the communication network 920 to the communication center apparatus 900. It is received at the receiving device 911 on the side of the communication center apparatus 910, and the received signal is reproduced at the data reproducing device 913, and then the data are transmitted back to the side of the communication navigation terminal 900 through the transmitting device 912 and the communication network 920. This is received at the receiving device 902 of the communication navigation terminal 900 and is reproduced at the data reproducing device 904. The reproduced data is inputted into the error detection device 905, and so is the data generated at and transmitted from the test signal generator 903, and they are compared with each other. It is determined at the service area determination device 906 whether or not the vehicle is within the service area according to the detection result at the error detection device 905, then outputting the result from the output device 907.

For example, suppose that a data row "0101010101" is generated as a test signal at the test signal generator 903 at the communication navigation terminal 900, and is then transmitted from the transmitting device 901. If all communication routes are normal, a data row received at the receiving device 911 and reproduced at the data reproducing device 913 of the communication center apparatus 910, is "0101010101" and this data is transmitted back to the communication navigation terminal 900 through the transmitting device 912 and the communication network 920.

The signal that is transmitted back is received at the receiving device 902 and is reproduced at the data reproducing device 904. In the same manner, if the communication route is normal, the reproduced data row is "0101010101". By comparing this reproduced data row with the original data row at the error detection device 905, it is possible to detect an error generated on the whole communication route. If the data row that is transmitted back is "0111010100", then this gives the fact that two errors were generated, which makes it possible to learn the communication quality of the whole communication route including the transmitting and receiving devices. The result at the error detection device 905 is determined at the service area determination device 906. For example, if there is one error, it is regarded as within the service area in view of the correction capability, and the condition is determined as being possible to normally transmit and receive information between the communication navigation terminal 900 and the communication center apparatus 910. If there are two errors or more, it is regarded as out of the service area, and the condition is determined as being impossible to normally transmit and receive information between the communication navigation terminal 900 and the communication center apparatus 910. This result is outputted at the output device 907 to inform the user. Although actual data rows are complicated, several times of transmissions and receptions can give accurate judgment of the quality of the communication route. The capability of restoring data by an error correction device is also important element of the judgment.

According to the above described method, it is possible to lead the user to perform the reroute operation by judging equally as out of the service area even if the condition of the communication center apparatus 903 is that it cannot be normally used because of troubles, maintenance, power failures, and the like, in addition to by the structure itself of the transmission route.

Incidentally, the display device 40 and the audio output device 50 constituting the communication navigation terminal 5 in the first embodiment can be used for the output device 907 constituting the communication navigation terminal 900. The CPU 22 can be used for the error detection device 905 and the service area determination device 906. The wireless communication device 38 can be used for the transmitting device 901 and the receiving device 902. On the side of the communication center apparatus 910, it is not necessary to add a new apparatus to the communication center apparatus 3 in the first embodiment. The microprocessor 72 may be programmed to organize and operate each constitutional element to operate the embodiment, which will help it realize.

Next, the use of the locus data as obtained above will be explained with reference to FIG. 7 and FIG. 8, focusing on the case of searching for a homeward route when a vehicle goes out of the service area of the communication navigation system.

Firstly, when a driver instructs the navigation terminal 5 to search for the homeward route (step S111), it is checked whether the current position of the vehicle is within or out of the service area of the communication navigation system by the electric field intensity of the received electric wave or the transmitted and received signal (step S112). If within the service area, the communication center apparatus 3 may be normally accessed to search for the homeward route (step S113).

On the contrary, if out of the service area, the search at the communication navigation terminal 5 is required (step S114). At this time, the locus data sampled and recorded in the past, the drive plan, the map information associated with the drive route provided from the communication center apparatus 3 when preparing the drive plan, and the like are used as search data. Moreover, as for the search, the microprocessor 20 performs it with reference to the information recorded in the hard disk device 36 and on the basis of (i) the information on the current position of the vehicle obtained by the GPS receiver 18, the self-contained positioning device 10 or the like, and (ii) keywords for the search inputted through the outer I/F device 61 by the driver.

In this case, it is preferable that there are many past locus data of the outer service area of the communication navigation system in the hard disc device 36, and therefore, the priority is given to the locus data of the outer service area than to the locus data of the inner service area as described above. Namely, this is the reason why such a structure is employed that most of the locus data of the outer service area are left in the recording device.

The searched homeward route is presented to the driver by the display 40 and/or the audio output device 50 (step S115). The driver operates the vehicle along the searched route (step S116) and becomes able to go home.

Next, this will be explained with time, with reference to a sequence chart in FIG. 8. This sequence chart is intended to show with time the relationship among the user (driver), the communication navigation terminal, and the communication center apparatus. The horizontal lines show the mutual relationship and the vertical lines, which direct up to down, show time elapsing.

Firstly, the user prepares a drive plan before a drive (step S121). In this case, the user presents a plan condition to the communication center apparatus 3 from the user terminal 4 such as a personal computer, a mobile or hand-carry type information terminal, or the like (step S122), a search is performed on the basis of that condition at the communication center apparatus 3 (step S123), and the plan information which meets the condition is presented to the user (step S124). The prepared drive plan is recorded in the user terminal 4 with the route information and the map information, and it is stored in the memory device 76 of the communication center apparatus 3 (step S125).

The user transports the prepared drive plan to the communication navigation terminal 5 before starting the drive. It is not necessary to do this in the case of preparing the drive plan by the communication navigation terminal 5. It is also conceivable of the case of the direct transportation from the communication center apparatus 3 to the communication navigation terminal 5 (step S126).

When going for the drive (step S127), the communication navigation terminal 5 starts sampling the locus of the vehicle at a predetermined interval and records it (step S128). Then, when the driver instructs the communication navigation terminal 5 to perform the route search while driving (step S129), the communication navigation terminal 5 judges whether the current position of the vehicle is within or out of the service area of the communication navigation system (step S130).

If within the service area, the communication center apparatus 3 is accessed, the information on the current position of the vehicle or the like, and the instruction of the route search is given (step S131). On the side of the communication center apparatus 3, the route is searched for from the map information database, the drive plan, recorded with the presented information, and the like (step S132), and the result is presented to the communication navigation terminal 5 (step S133). The route information provided form the communication center apparatus 3 becomes highly precise and highly accurate by using the enormous map data provided for the apparatus and the newest information on it as a base, using an operation method by means of an operation algorithm with a high accuracy or the like, and using the operation by a high-performance high-speed microprocessor.

On the contrary, if out of the service area, the communication center apparatus 3 cannot be used and the communication navigation terminal 5 itself performs the route search (step S134). The search result is presented to the driver at the display 40 and/or the audio output device 50 of the communication navigation terminal 5 (step S135). The driver confirms this (step S136), and operates the vehicle (step S137).

As described above, according to this embodiment, even if the vehicle goes out of the service area of the communication navigation system, it is possible to search for the effective traveling route.

(I) Second Embodiment

Next, the second embodiment will be explained with reference to FIG. 9. The second embodiment relates to a recording method of the locus data of the communication navigation terminal. In the first embodiment, since data are rewritten with the locus data of the outer service area left, the whole record area finally becomes the locus data of the outer service area. Therefore, the second embodiment is intended to try to leave both the locus data of the inner service area and the locus data of the outer service area in a predetermined ratio. Incidentally, the other structures of the communication navigation system and their operations in the second embodiment are the same as those described above in the first embodiment, and their explanation is omitted.

Figure 9:
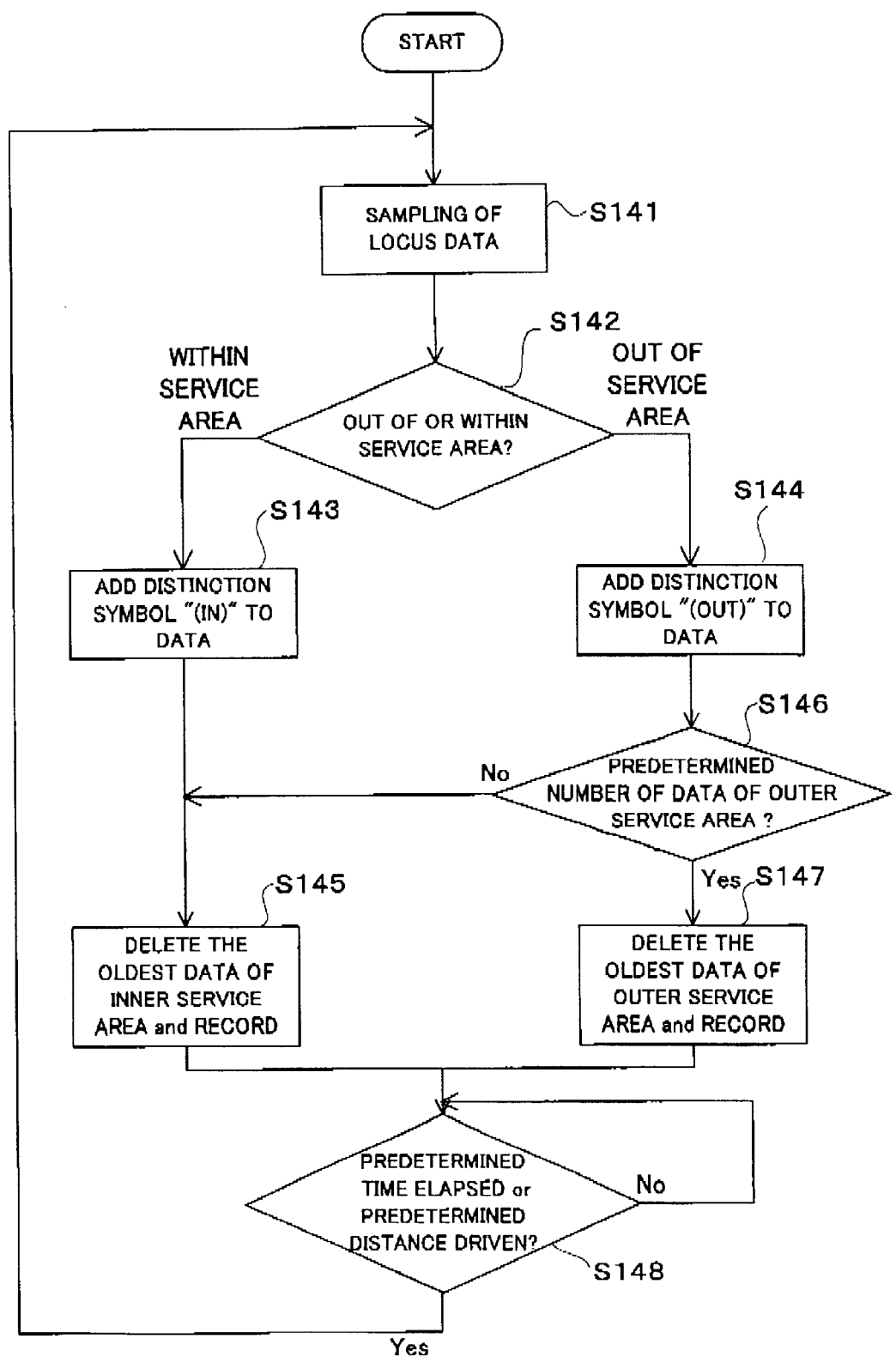
FIG. 9 is a flow chart showing operational flows of incorporating locus data in a second embodiment of the present invention.

As shown in FIG. 9, firstly, with respect to the incorporation and the record of the locus data, the sampling of the locus data is performed at a predetermined interval upon the drive start as shown in a flow chart in FIG. 9 (step S141). This is performed by receiving the electric waves transmitted from satellites with the GPS receiver 18 of the communication navigation terminal 5 shown in FIG. 27 obtaining by these the position of the self-car, and recording its position information, the drive plan, the map information associated with the drive plan, and the like, as is the case of the first embodiment.

Secondly, it is judged whether the current position of the vehicle is within or out of the service area of the communication of the navigation system (step S142). This judgment can be performed on the basis of the level of the electric field intensity of the electric wave received by the communication navigation terminal 5. Namely, it is judged on the basis of the electric field intensity of the electric wave from the cell base station 2a, which spreads the signal from the communication center apparatus 3 that the communication navigation terminal 5 receives. If the electric field intensity is low and the transmitted information does not have sufficient quality because of noise, it is judged out of the service area. Obviously, this may use the device (refer to FIG. 6 and the like) explained in the first embodiment. Then, in order to identify whether the sampled locus data are within or out of the service area, if within the service area, a symbol meaning "within the service area" (e.g., "IN") is added to the locus data (step S143), and if out of the service area, a symbol meaning "out of the service area" (e.g., "OUT") is added (step S144).

If the locus data newly inputted are the data of the inner service area, the oldest data of the inner service area are deleted and new data are written (step S145).

If the locus data newly inputted are the data of the outer service area, it is judged whether or not the locus data of the outer service area reach the limited amount which is predetermined (step S146). If not reaching to the limited amount (step S146: No), the oldest locus data of the inner service area are deleted and the new locus data are written (step S145). On the contrary, if reaching the limited amount, the oldest locus data of the outer service area are deleted and new locus data are written (step S147).

Next, it is judged whether a predetermined time has elapsed or whether the self-vehicle has driven for a predetermined distance (step S148), the operational flow returns to the step S141, and the sampling of the next locus data is performed.

Next, a recording method of the locus data will be explained with reference to FIG. 10 and FIG. 11.

Assuming that it is possible to record in the record area, for example, 1024 locus data from the section 0 to the section 1023, and the locus data of the outer service area can be recorded preferentially in 768 sections from the section 256 to the section 1023 out of them. Namely, the priority is given to the locus data of the outer service area in these 768 sections.

Figures 10A, 10B:
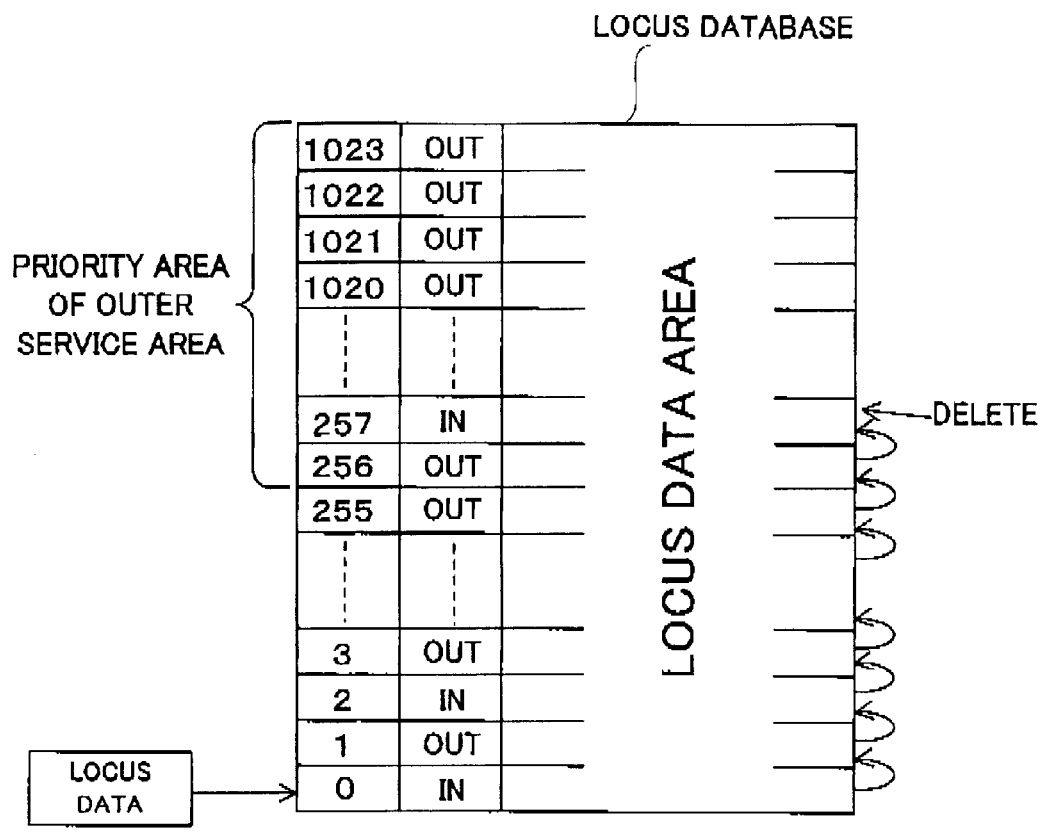
FIG. 10A and FIG. 10B are schematic diagrams showing a record condition of the locus data in the second embodiment of the present invention.

Firstly, as shown in FIG. 10A, it is assumed that the section 257 has data of the inner service area (as indicated by the "IN" symbol), and all sections from the section 256 to the section 1023 are not occupied with data of the outer service area. In this case, if the data of the outer service area are inputted, the oldest data of the inner service area in the section 257 are deleted, the other data are passed on progressively, and the relevant data of the outer service area are written in the end (FIG. 10B). This corresponds to the flow in the steps S144, S146, and S145 in FIG. 9. In the same manner, if the data of the inner service area are inputted, the oldest data of the inner service area in the section 257 area deleted, the other data are passed on progressively, and the relevant data of the inner service area are written in the end (FIG. 10B). This corresponds to the flow in the steps 143 and S145 in FIG. 9.

Figures 11A, 11B, 11C:
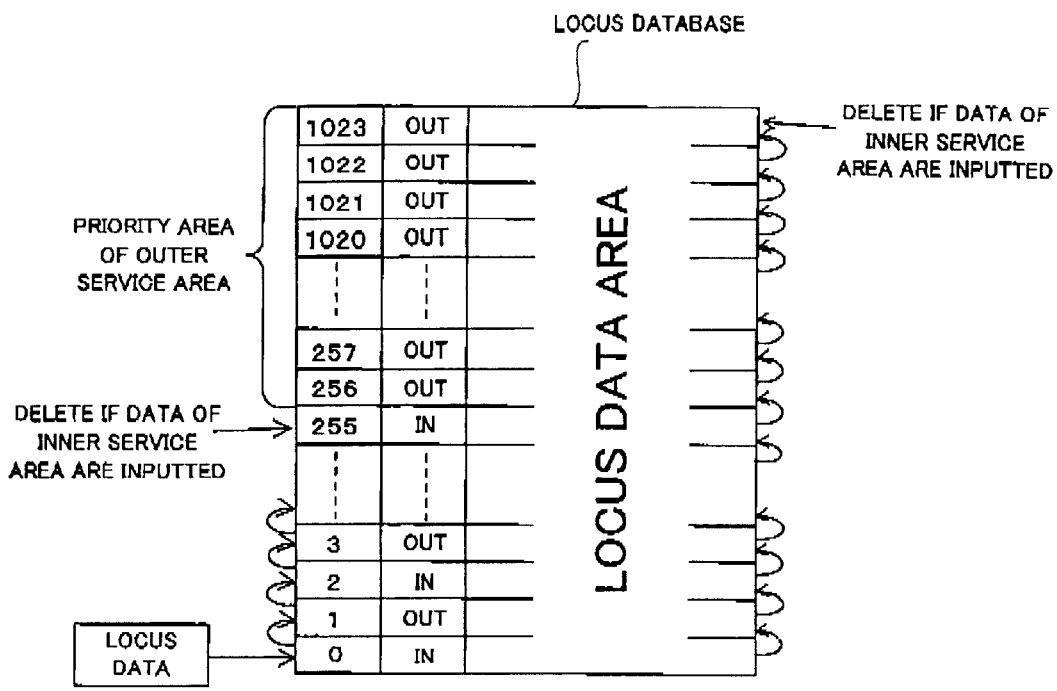
FIG. 11A to FIG. 11C are schematic diagrams showing a record condition of the locus data in the second embodiment of the present invention.

Secondly, as shown in FIG. 11A, it is assumed that all sections from the section 256 to the section 1023 have been occupied with the data of the outer service area. In this case, if the data of the outer service area are inputted, the oldest data of the outer service area in the section 1023 are deleted, the other data are passed on progressively, and the relevant data of the outer service area are written in the end. If the section 255 has the data of the inner service area, they are written in the section 256, which is in the priority area for the outer service area (FIG. 11B). This corresponds to the flow in the steps S144, S146, and S147 in FIG. 9. If the data of the inner service area are inputted, the oldest data of the inner service area in the section 255 are deleted, the other data are passed on progressively, and the relevant data of the inner service area are written in the end (FIG. 11C). This corresponds to the flow in the steps S143 and S145 in FIG. 9.

In this embodiment, the record area is not wasted, and it is possible to hold the locus data of the outer service area for a predetermined range, which are important in the case that a vehicle goes into an area where the service of the communication navigation system is not received and that the search for a drive route is required at the communication navigation terminal.

(III) Third Embodiment

Next, the third embodiment will be explained with reference to FIG. 12. The third embodiment relates to another method of recording the locus data of the communication navigation terminal. In the first embodiment, since data are rewritten with the locus data of the outer service area left, the whole record area finally becomes the locus data of the outer service area. Therefore, in the third embodiment, there are provided one record file for the inner service area, where the locus data of the inner service area are recorded, and another record file for the outer service area, where the locus data of the outer service area are recorded. Incidentally, the other structures of the communication navigation system and their operations in the third embodiment are the same as those described above in the first embodiment, and their explanation is omitted.

Figure 12:
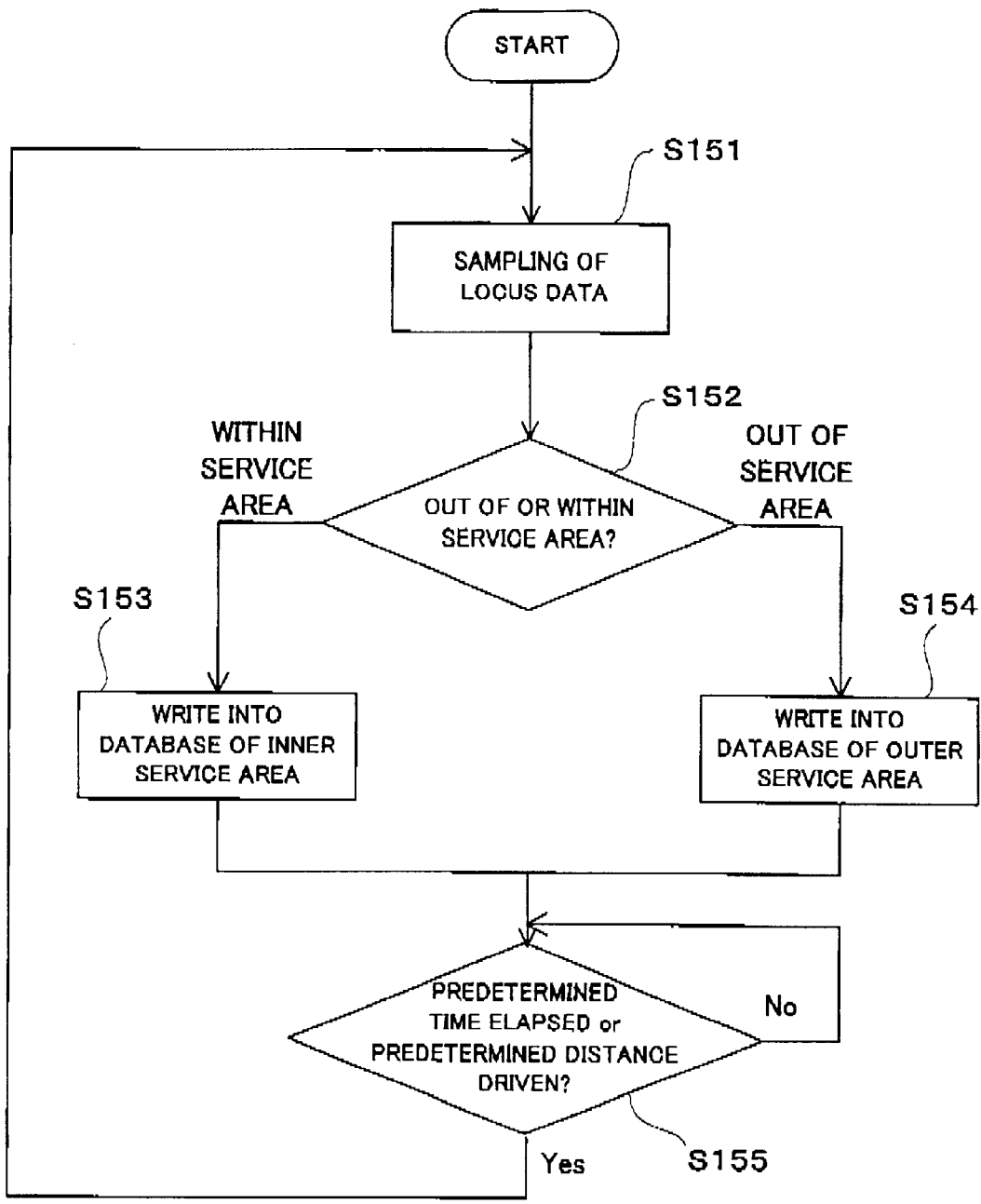
FIG. 12 is a flow chart showing operational flows of incorporating locus data in a third embodiment of the present invention.

As shown in FIG. 12 firstly, with respect to the incorporation and the record of the locus data, the sampling of the locus data is performed at a predetermined interval upon the drive start (step S151). This is performed by receiving the electric waves transmitted from the satellites with the GPS receiver 18 of the communication navigation terminal 5 shown in FIG. 2, obtaining by these the position of the self-car, and recording its position information, the drive plan, the map information associated with the drive plan and the like, as is the case of the above described embodiment.

Secondly, it is judged whether the current position of the vehicle is within or out of the service area of the communication of the navigation system (step S152). This judgment can be performed on the basis of the level of the electric field intensity of the electric wave received by the communication navigation terminal 5. Namely, it is judged on the basis of the electric field intensity of the electric wave from the cell base station 2a, which spreads the signal from the communication center apparatus 3 that the communication navigation terminal 5 receives. If the electric field intensity is low and the transmitted information does not have sufficient quality because of noise, it is judged out of the service area. Obviously, this may use the device explained in the first embodiment. Then, after this judgment as for within and out of the service area, if within the service area, writing into the database of the inner service area is performed (step S153), while if out of the service area, writing into the database of the outer service area is performed (step S154).

Next, it is judged whether a predetermined time has elapsed or whether the self-vehicle has driven for a predetermined distance (step S155), the operational flow returns to the step S151, and the sampling of the next locus data is performed.

Figure 13:
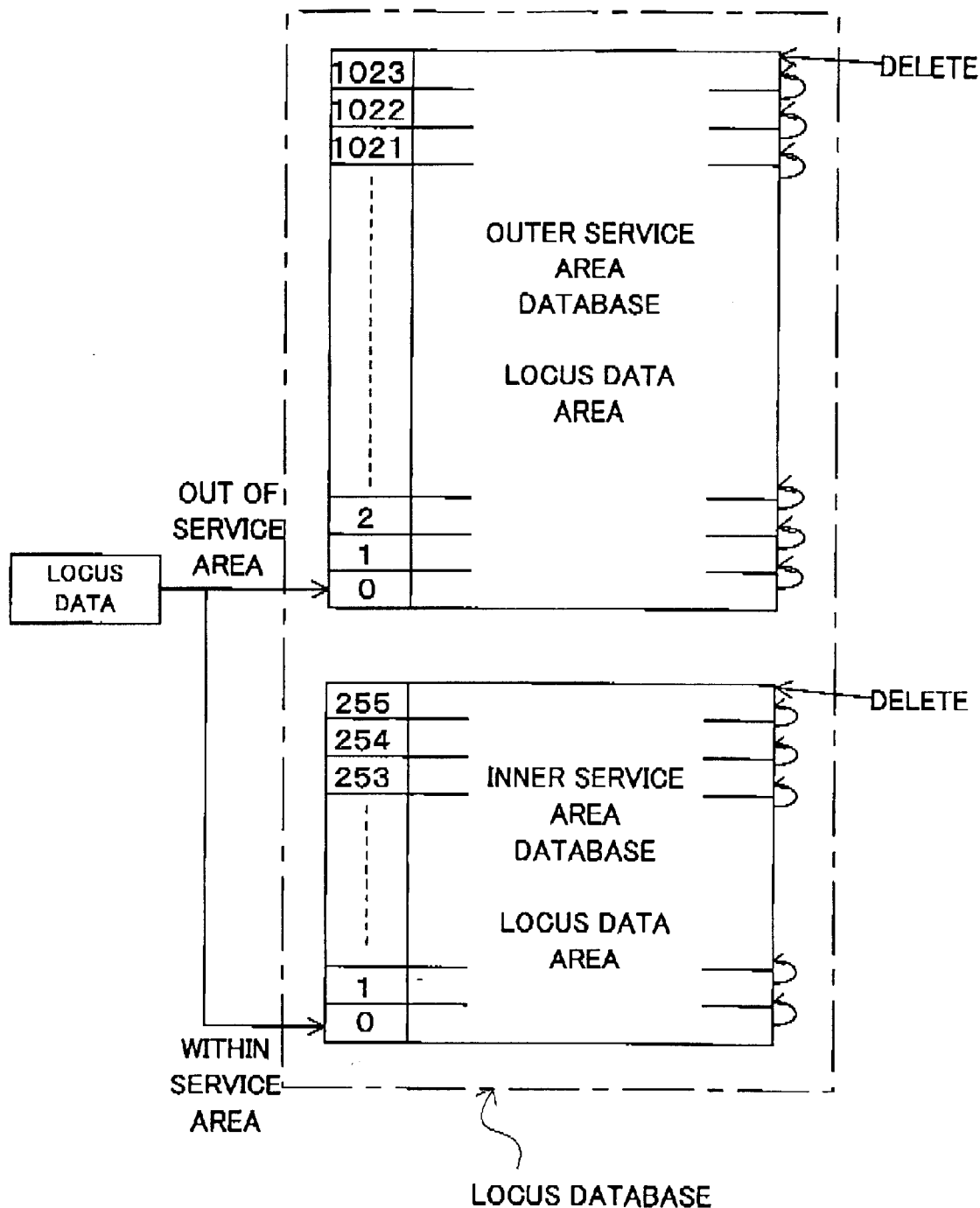
FIG. 13 is a schematic diagram showing a record condition of the locus data in the third embodiment of the present invention.

Next, a recording method of the locus data will be explained with reference to FIG. 13.

A locus database is provided with an inner service area database and an outer service area database, and it is constructed, for example, such that the inner service area database can record therein 256 different locus data from the section 0 to the section 255 while the outer service area database can record therein 1024 different locus data from the section 0 to the section 1023.

The update of recording data is easy in the above described database form, and if the sampled locus data are the data of the inner service area, for example, the other data are passed on progressively and writing into the section 0 of the inner service area database is performed. If the inner service area database is fully used, the data in the oldest section 1023 of the corresponding database may be deleted (in reality, they are deleted from the database automatically by overflow), the other data may be passed on progressively, and the new locus data may be written into the end. This is also the same as the data of the outer service area.

In the third embodiment, the databases for recording the locus data are exclusively provided with them divided into for the outer service area and the inner service area, and thus it is easy to process data, and even if a microprocessor for controlling does not have high functions, it is still possible to manage. Moreover, with respect to the search for the drive route, it may be only performed for the database of the outer service area, and a backup memory becomes unnecessary in rewriting and changing order.

Furthermore, the communication navigation terminal 5 of the present invention may be applied for various navigation terminal, not for a vehicle as described in each embodiment above, but for various movable bodies such as an airplane, a ship, a bicycle, or the like. It may be further applied for those for an animal and a pedestrian, who uses a mobile phone, a mobile or hand-carry type information terminal, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-266476 filed on Sep. 3, 2001 including the specification, claims, drawings and summary is incorporated herein by reference in its entirety.

What is claimed is:

1. A communication navigation system comprising: a communication center apparatus; and a communication navigation terminal, both of which transmit and receive information by a two-way communication through a communication network, (i) said communication center apparatus comprising:
a map database for storing therein map database information including information for a route search, which enables the route search from a current position of a movable body to a destination by a predetermined algorithm;
a search device for searching, by the predetermined algorithm, for a route heading to the destination from the current position, on the basis of the map database information including the information for the route search, according to the destination and the current position received through the communication network; and
a center side wireless device for wirelessly transmitting route information indicating the searched route through the communication network, (ii) said communication navigation terminal comprising:
a measurement device for measuring the current position;
a terminal side wireless device for transmitting the measured current position and receiving the transmitted route information through the communication network;
a traveling locus recording device for recording a traveling locus of the movable body such that it preferentially holds the traveling locus recorded when the movable body is moving out of a service area of said communication navigation system; and
a processing device for performing navigation processing of a predetermined type based on the preferentially held traveling locus in case that the movable body is moving out of the service area.

2. The system according to claim 1, wherein said traveling locus recording device records the traveling locus with information indicating within or out of the service area.

3. The system according to claim 1, wherein said traveling locus recording device deletes the traveling locus recorded when the movable body is traveling within the service area, in an order from old to new one.

4. The system according to claim 1, wherein said traveling locus recording device gives priority to recording the traveling locus out of the service area than to recording the traveling locus within the service area until the traveling locus out of the service area occupies a predetermined ratio of a record area of said traveling locus recording device, and said traveling locus recording device replaces the traveling locus in an order from old to new one.

5. The system according to claim 1, wherein said traveling locus recording device is equipped with a first record area for recording the traveling locus within the service area and a second record area for recording the traveling locus out of the service area and replaces the traveling locus in an order from old to new one respectively in the first and second record areas.

6. The system according to claim 1, wherein the navigation processing of the predetermined type is processing of searching for at least one of a route and a direction to be traveled by the movable body, from the measured current position and the preferentially held traveling locus.

7. A communication navigation system comprising: a communication center apparatus; and a communication navigation terminal, both of which transmit and receive information by a two-way communication through a communication network,
  (i) said communication center apparatus comprising:
    a map database for storing therein map database information including information for a route search, which enables the route search from a current position of a movable body to a destination by a predetermined algorithm;
    a search device for searching, by the predetermined algorithm, for a route heading to the destination from the current position, on the basis of the map database information including the information for the route search, from the destination and the current position received through the communication network; and
    a center side wireless device for wirelessly transmitting route information indicating the searched route through the communication network,
  (ii) said communication navigation terminal comprising:
    a measurement device for measuring the current position;
    a terminal side wireless device for transmitting the measured current position and receiving the transmitted route information through the communication network;
    a traveling locus recording device for recording a traveling locus of the movable body; and
    a processing device for searching for at least one of a route and a direction to be traveled by the movable body as navigation processing of a predetermined type based on the measured current position and the recorded traveling locus in case that the movable body is moving out of the service area.

8. The system according to claim 1, wherein said communication navigation terminal further comprises a judgment device for judging whether the current position is within or out of the service area.

9. The system according to claim 7, wherein said communication navigation terminal further comprises a judgment device for judging whether the current position is within or out of the service area.

10. The system according to claim 8, wherein said judgment device judges on the basis of an electric field intensity of an electric wave received by said terminal side wireless device.

11. The system according to claim 9, wherein said judgment device judges on the basis of an electric field intensity of an electric wave received by said terminal side wireless device.

12. The system according to claim 8, wherein said judgment device judges by transmitting a predetermined data row to said communication center apparatus from said communication navigation terminal, restoring the received data row at said communication center apparatus and transmitting it back to said communication navigation terminal, and then comparing the received data row with the transmitted data row at said communication navigation terminal.

13. The system according to claim 9, wherein said judgment device judges by transmitting a predetermined data row to said communication center apparatus from said communication navigation terminal, restoring the received data row at said communication center apparatus and transmitting it back to said communication navigation terminal, and then comparing the received data row with the transmitted data row at said communication navigation terminal.

14. The system according to claim 8, wherein a judgment of said judgment device is performed at a predetermined time interval.

15. The system according to claim 9, wherein a judgment of said judgment device is performed at a predetermined time interval.

16. The system according to claim 8, wherein a judgment of said judgment device is performed at a predetermined driving distance interval.

17. The system according to claim 9, wherein a judgment of said judgment device is performed at a predetermined driving distance interval.

18. The system according to claim 8, wherein said processing device performs the navigation processing of the predetermined type in case that the current position is judged to belong out of the service area by said judgment device.

19. The system according to claim 9, wherein said processing device performs the navigation processing of the predetermined type in case that the current position is judged to belong out of the service area by said judgment device.

20. The system according to claim 1, further comprising a user communication terminal for performing a two-way communication on the communication network,
  said user communication terminal being capable of transmitting the destination to said communication center apparatus.

21. The system according to claim 7, further comprising a user communication terminal for performing a two-way communication on the communication network,
  said user communication terminal being capable of transmitting the destination to said communication center apparatus.

22. A communication navigation terminal for transmitting and receiving information by a two-way communication through a communication network with respect to a communication center apparatus provided with: (i) a map database for storing therein map database information including information for a route search, which enables the route search from a current position of a movable body to a destination by a predetermined algorithm; (ii) a search device for searching, by the predetermined algorithm, for a route heading to the destination from the current position, on the basis of the map database information including the information for the route search, according to the destination and the current position received through the communication network; and (iii) a center side wireless device for wirelessly transmitting route information indicating the searched route through the communication network, said communication navigation terminal comprising:
a measurement device for measuring the current position;
a terminal side wireless device for transmitting the measured current position and receiving the transmitted route information through the communication network;
a traveling locus recording device for recording a traveling locus of the movable body such that it preferentially holds the traveling locus recorded when the movable body is moving within a service area of a communication navigation system; and
a processing device for performing navigation processing of a predetermined type based on the preferentially held traveling locus in case that the movable body is moving out of the service area.

23. A program storage device readable by a computer in a communication navigation system for tangibly embodying a program of instructions executable by the computer to perform method processes of communication navigation at a communication navigation terminal for transmitting and receiving information by a two-way communication through a communication network with respect to a communication center apparatus provided with: (i) a map database for storing therein map database information including information for a route search, which enables the route search from a current position of a movable body to a destination by a predetermined algorithm; (ii) a search device for searching, by the predetermined algorithm, for a route heading to the destination from the current position, on the basis of the map database information including the information for the route search, according to the destination and the current position received through the communication network; and (iii) a center side wireless device for wirelessly transmitting route information indicating the searched route through the communication network, said method processes comprising:
a measurement process of measuring the current position;
a terminal side wireless process of transmitting the measured current position and receiving the transmitted route information through the communication network;
a traveling locus recording process of recording a traveling locus of the movable body such that it preferentially holds the traveling locus recorded when the movable body is moving within a service area of a communication navigation system; and
a process of performing navigation processing of a predetermined type based on the preferentially held traveling locus in case that the movable body is moving out of the service area.

24. A computer data signal embodied in a carrier wave and representing a series of instructions which cause a computer in a communication navigation system to perform method processes of communication navigation at a communication navigation terminal for transmitting and receiving information by a two-way communication through a communication network with respect to a communication center apparatus provided with: (i) a map database for storing therein map database information including information for a route search, which enables the route search from a current position of a movable body to a destination by a predetermined algorithm; (ii) a search device for searching, by the predetermined algorithm, for a route heading to the destination from the current position, on the basis of the map database information including the information for the route search, according to the destination and the current position received through the communication network; and (iii) a center side wireless device for wirelessly transmitting route information indicating the searched route through the communication network, said method processes comprising:
measurement process of measuring the current position;
a terminal side wireless process of transmitting the measured current position and receiving the transmitted route information through the communication network;
a traveling locus recording process of recording a traveling locus of the movable body such that it preferentially holds the traveling locus recorded when the movable body is moving within a service area of a communication navigation system; and
a process of performing navigation processing of a predetermined type based on the preferentially held traveling locus in case that the movable body is moving out of the service area.

25. A program storage device readable by a computer for tangibly embodying a program of instructions executable by the computer to perform method processes of communication navigation in a communication navigation system, said system comprising: a communication center apparatus; and a communication navigation terminal, both of which transmit and receive information by a two-way communication through a communication network, said method processes comprising:
(i) at said communication center apparatus,
a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and
a center side wireless process of wirelessly transmitting route information indicating the searched route through the communication network, and
(ii) at said communication navigation terminal,
a measurement process of measuring the current position;
a terminal side wireless process of transmitting the measured current position and receiving the transmitted route information through the communication network;
a traveling locus recording process of recording a traveling locus of the movable body such that it preferentially holds the traveling locus recorded when the movable body is moving out of a service area of said communication navigation system; and
a process of performing navigation processing of a predetermined type based on the preferentially held traveling locus in case that the movable body is moving out of the service area.

26. A computer data signal embodied in a carrier wave and representing a series of instructions which cause a computer to perform method processes of communication navigation in a communication navigation system, said system comprising: a communication center apparatus; and a communication navigation terminal, both of which transmit and receive information by a two-way communication through a communication network,
  (i) at said communication center apparatus,
    a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and
    a center side wireless process of wirelessly transmitting route information indicating the searched route through the communication network, and
  (ii) at said communication navigation terminal,
    a measurement process of measuring the current position;
    a terminal side wireless process of transmitting the measured current position and receiving the transmitted route information through the communication network;
    a traveling locus recording process of recording a traveling locus of the movable body such that it preferentially holds the traveling locus recorded when the movable body is moving out of a service area of said communication navigation system; and
    a process of performing navigation processing of a predetermined type based on the preferentially held traveling locus in case that the movable body is moving out of the service area.

27. A program storage device readable by a computer for tangibly embodying a program of instructions executable by the computer to perform method processes of communication navigation in a communication navigation system, said system comprising: a communication center apparatus; and a communication navigation terminal, both of which transmit and receive information by a two-way communication through a communication network,
  said method processes comprising:
    (i) at said communication center apparatus,
      a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and
      a center side wireless process of wirelessly transmitting route information indicating the searched route through the communication network, and
    (ii) at said communication navigation terminal,
      a measurement process of measuring the current position;
      a terminal side wireless process of transmitting the measured current position and receiving the transmitted route information through the communication network;
      a traveling locus recording process of recording a traveling locus of the movable body; and
      a process of searching for at least one of a route and a direction to be traveled by the movable body as navigation processing of a predetermined type based on the measured current position and the recorded traveling locus in case that the movable body is moving out of the service area.

28. A computer data signal embodied in a carrier wave and representing a series of instructions which cause a computer to perform method processes of communication navigation in a communication navigation system, said system comprising: a communication center apparatus; and a communication navigation terminal, both of which transmit and receive information by a two-way communication through a communication network,
  said method processes comprising:
    (i) at said communication center apparatus,
      a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and
      a center side wireless process of wirelessly transmitting route information indicating the searched route through the communication network, and
    (ii) at said communication navigation terminal,
      a measurement process of measuring the current position;
      a terminal side wireless process of transmitting the measured current position and receiving the transmitted route information through the communication network;
      a traveling locus recording process of recording a traveling locus of the movable body; and
      a process of searching for at least one of a route and a direction to be traveled by the movable body as navigation processing of a predetermined type based on the measured current position and the recorded traveling locus in case that the movable body is moving out of the service area.

29. A communication navigation method executed in a communication navigation system comprising: a communication center apparatus; and a communication navigation terminal, both of which transmit and receive information by a two-way communication through a communication network,
  said method comprising:
    (i) at said communication center apparatus,
      a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and
      a center side wireless process of wirelessly transmitting route information indicating the searched route through the communication network, and
    (ii) at said communication navigation terminal,
      a measurement process of measuring the current position;

a terminal side wireless process of transmitting the measured current position and receiving the transmitted route information through the communication network;

a traveling locus recording process of recording a traveling locus of the movable body such that it preferentially holds the traveling locus recorded when the movable body is moving out of a service area of said communication navigation system; and a process of performing navigation processing of a predetermined type based on the preferentially held traveling locus in case that the movable body is moving out of the service area.

30. A communication navigation method executed in a communication navigation system comprising: a communication center apparatus; and a communication navigation terminal, both of which transmit and receive information by a two-way communication through a communication network, said method comprising:

(i) at said communication center apparatus, a search process of searching, by a predetermined algorithm, for a route heading to a destination from a current position of a movable body, according to the destination and the current position received through the communication network, on the basis of a map database for storing therein map database information including information for a route search, which enables the route search from the current position to the destination by the predetermined algorithm; and a center side wireless process of wirelessly transmitting route information indicating the searched route through the communication network, and (ii) at said communication navigation terminal, a measurement process of measuring the current position;

a terminal side wireless process of transmitting the measured current position and receiving the transmitted route information through the communication network;

a traveling locus recording process of recording a traveling locus of the movable body; and a process of searching for at least one of a route and a direction to be traveled by the movable body as navigation processing of a predetermined type based on the measured current position and the recorded traveling locus in case that the movable body is moving out of the service area.

\* \* \* \* \*